(12) United States Patent
Kanamori

(10) Patent No.: US 8,648,902 B2
(45) Date of Patent: Feb. 11, 2014

(54) IMAGE PROCESSING APPARATUS

(75) Inventor: Katsuhiro Kanamori, Nara (JP)

(73) Assignee: Panasonic Corporation, Osaka (JP)

( * ) Notice: Subject to any disclaimer, the term of this patent is extended or adjusted under 35 U.S.C. 154(b) by 99 days.

(21) Appl. No.: 13/455,386

(22) Filed: Apr. 25, 2012

(65) Prior Publication Data

US 2012/0206581 A1 Aug. 16, 2012

Related U.S. Application Data

(63) Continuation of application No. PCT/JP2011/003931, filed on Jul. 8, 2011.

(30) Foreign Application Priority Data

Jul. 21, 2010 (JP) ................................. 2010-164074

(51) Int. Cl.
*A61B 1/04* (2006.01)

(52) U.S. Cl.
USPC ............................................ 348/68; 356/453

(58) Field of Classification Search
None
See application file for complete search history.

(56) References Cited

U.S. PATENT DOCUMENTS

| | | | |
|---|---|---|---|
| 2002/0196446 A1* | 12/2002 | Roth et al. | 356/479 |
| 2009/0079982 A1 | 3/2009 | Lefaudeux | |
| 2009/0135183 A1 | 5/2009 | Sato et al. | |
| 2009/0290039 A1 | 11/2009 | Kanamori et al. | |
| 2010/0253820 A1 | 10/2010 | Kanamori et al. | |
| 2010/0283883 A1 | 11/2010 | Sato et al. | |
| 2010/0303344 A1 | 12/2010 | Sato et al. | |
| 2011/0267483 A1 | 11/2011 | Kanamori | |

FOREIGN PATENT DOCUMENTS

| | | |
|---|---|---|
| JP | 11-313242 A | 11/1999 |
| JP | 2007-086720 A | 4/2007 |
| JP | 2009-246770 A | 10/2009 |
| JP | 2010-104424 A | 5/2010 |
| JP | 4762369 B2 | 6/2011 |
| WO | 2008/149489 A1 | 12/2008 |
| WO | 2009/157129 A1 | 12/2009 |

OTHER PUBLICATIONS

International Search Report for corresponding International Application No. PCT/JP2011/003931 mailed Oct. 18, 2011.
Lefaudeux et al., "Compact and robust linear Stokes polarization camera", Proc. of SPIE, vol. 6972, 69720B-1-12, (2008), Polarization: Measurement, Analysis, and Remote Sensing VIII.

(Continued)

*Primary Examiner* — Sath V Perungavoor
*Assistant Examiner* — Dakshesh Parikh
(74) *Attorney, Agent, or Firm* — Renner, Otto, Boisselle & Sklar, LLP

(57) ABSTRACT

In one embodiment, an element 106 transforms non-polarized light into plane polarized light with an arbitrary plane of polarization. A synchronizer 112 gives the element 106 an instruction to rotate the plane of polarization, thereby getting the plane of polarization of the illumination rotated and casting that polarized illumination toward the object. At the same time, the synchronizer 112 sends a shooting start signal to an image sensor 110, thereby getting video. The synchronizer 112 performs these processing steps multiple times. A captured video signal is sent to an image processing processor 108. Candidates for the azimuth angle of a surface normal are obtained based on an intensity maximizing angle image, the zenith angle of the surface normal is obtained based on a degree of intensity modulation image, and the ambiguity of the azimuth angle is solved, thereby generating a surface groove normal image.

14 Claims, 33 Drawing Sheets

(56) References Cited

OTHER PUBLICATIONS

Atkinson et al., "Recovery of Surface Oreintation From Diffuse Polarization", IEEE Transactions on Image Processing, vol. 15, No. 6, Jun. 2006, pp. 1653-1644.

Miyazaki et al., "Measuring Surface Shape of Transparent Objects from the Analysis of Parabolic Curves and Polarization", Journal of Information Processing, vol. 44, No. SIG 9 (CVIM 7), Jul. 2003, pp. 86-93.

* cited by examiner

FIG. 4
(a)
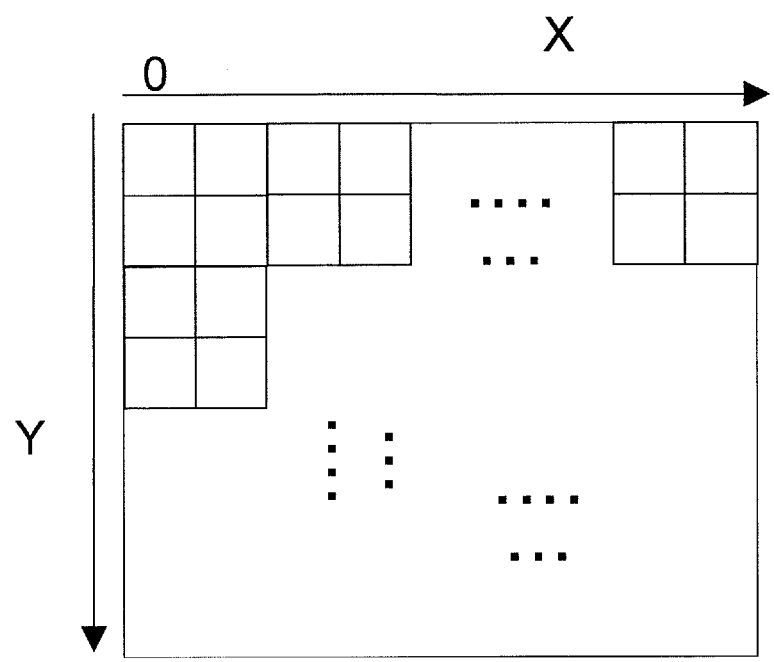
(b)
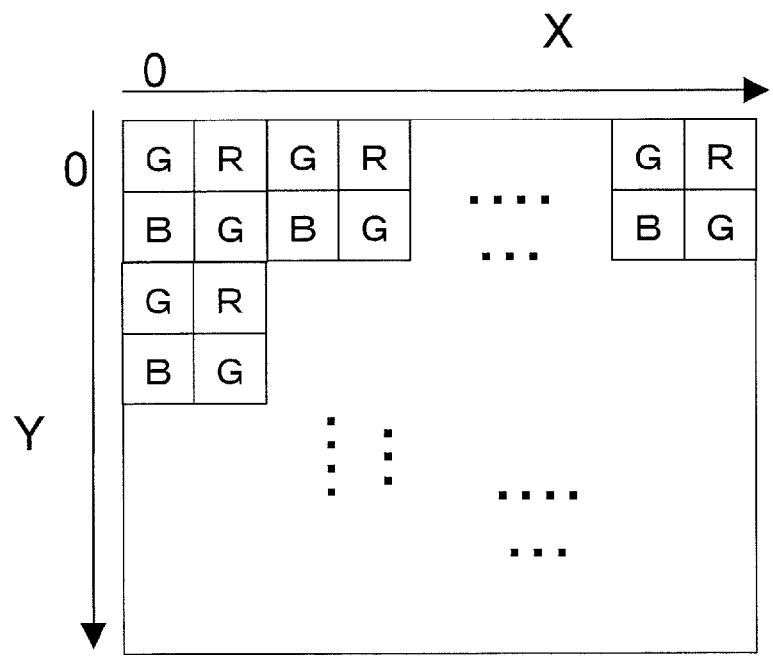

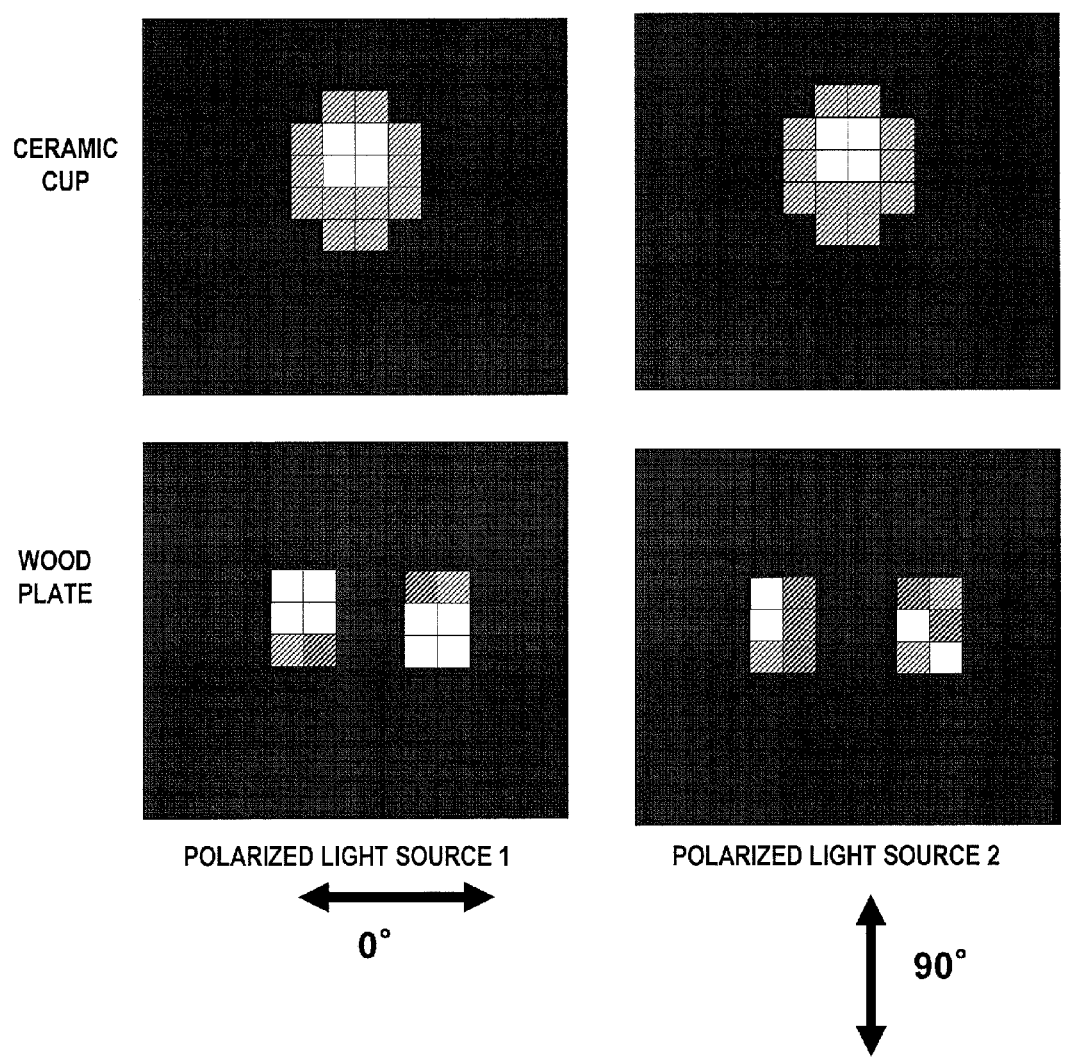

(a)　　　　　　　　　　　(b)

*FIG.13*
(a)
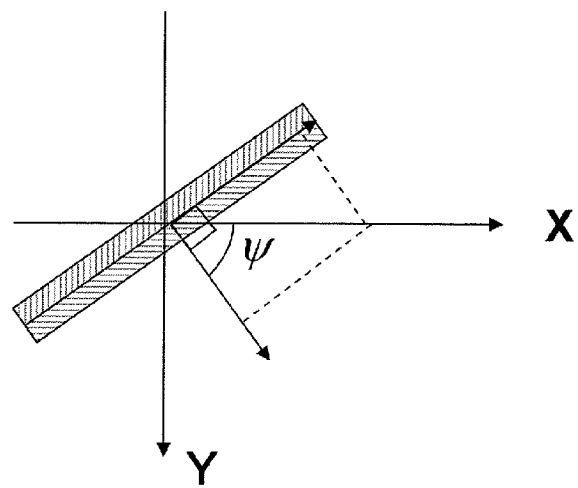
(b)
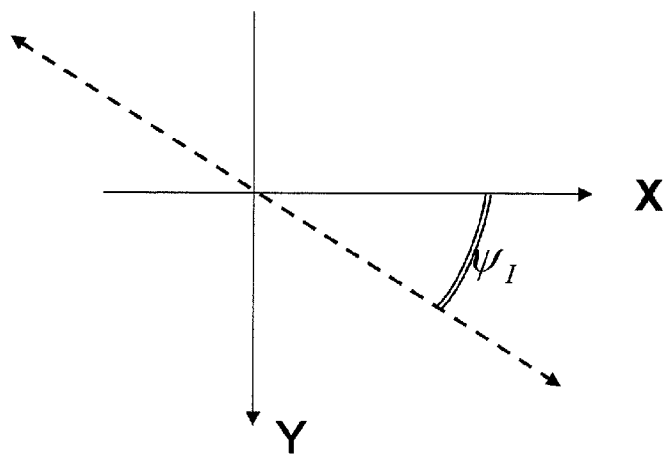
(c)
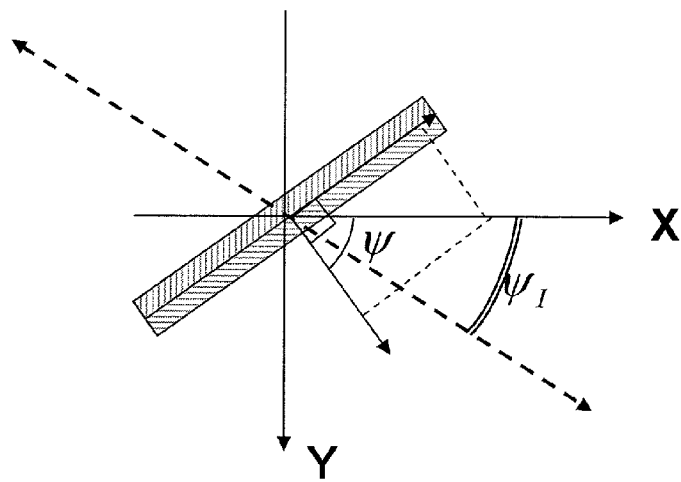

FIG.15    1501
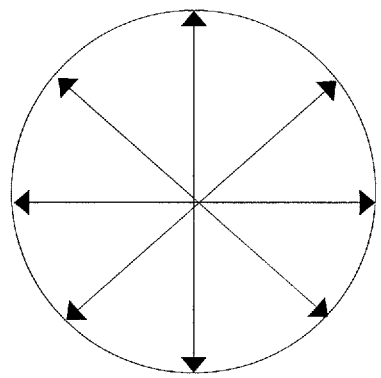
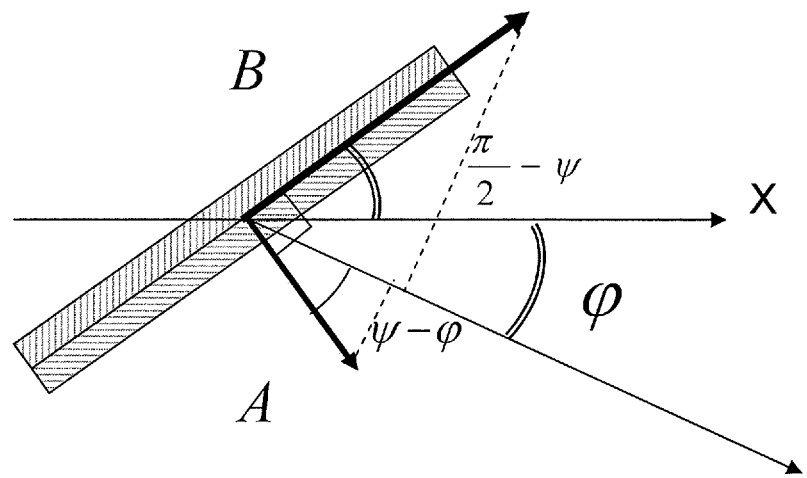

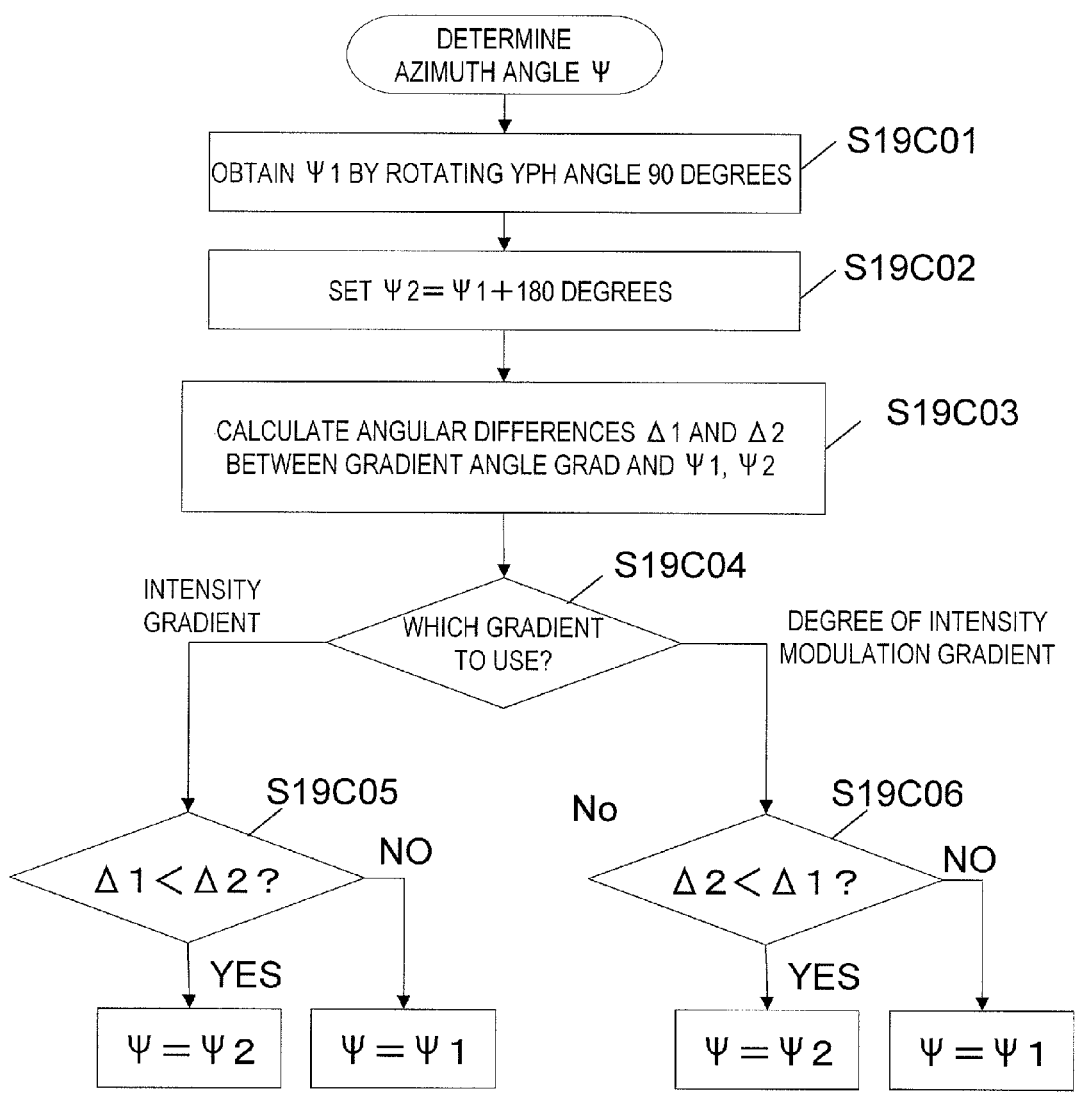

*FIG.21*
(a)
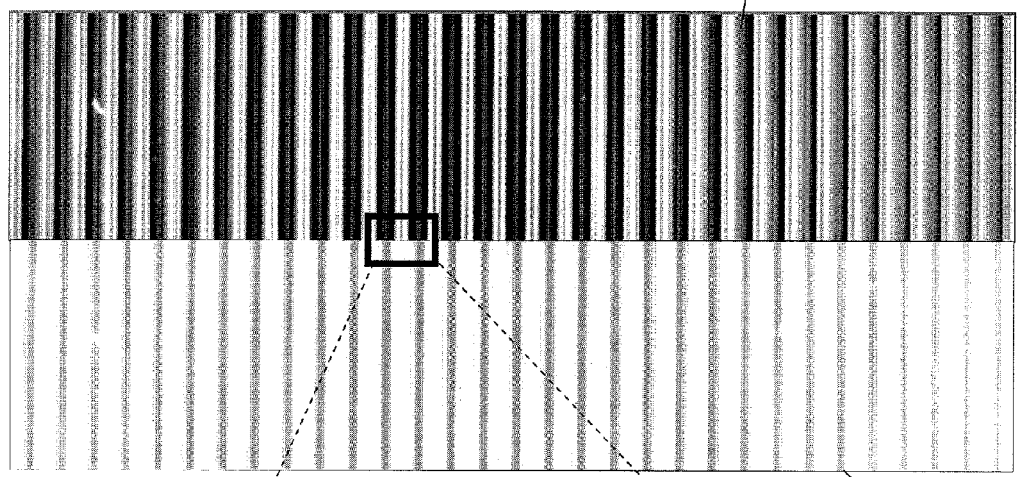
(b)
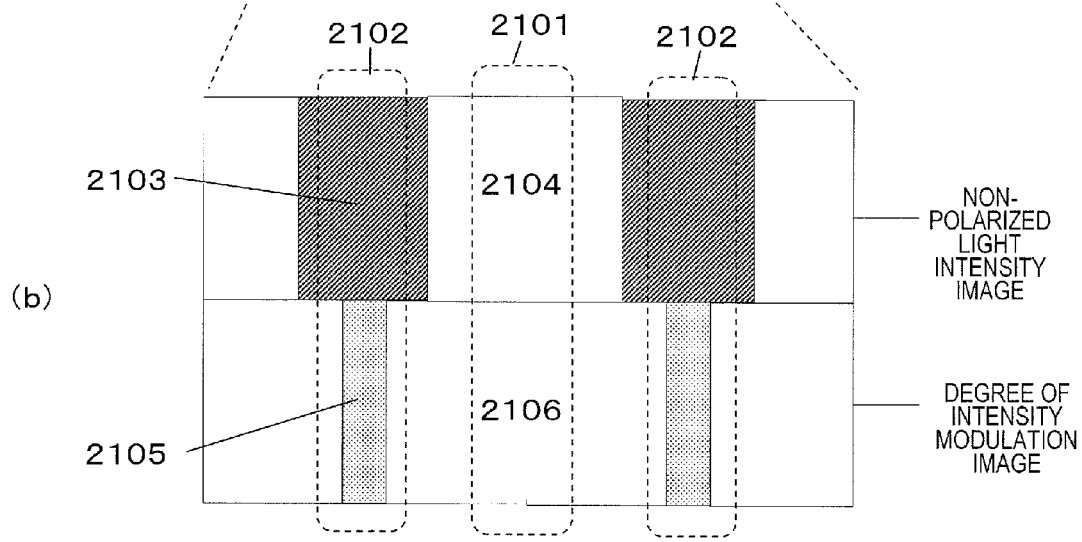

IMAGE PROCESSING APPARATUS

This is a continuation of International Application No. PCT/JP2011/003931, with an international filing date of Jul. 8, 2011, which claims priority of Japanese Patent Application No. 2010-164074, filed on Jul. 21, 2010, the contents of which are hereby incorporated by reference.

BACKGROUND

1. Technical Field

The present application relates to an image processing apparatus that can obtain surface microfacet information that surpasses information to be normally obtained by an image sensor from a two-dimensional light intensity image.

2. Related Art

In the field of endoscopes that capture an image of an organism's organ by irradiating the surface of the organ, which is covered with a semi-transparent mucosa, with light, the surface texture and an image of a blood vessel under the surface need to be checked with regular reflection (i.e., specular reflection) from the surface avoided. To do that, a polarizing endoscope that uses polarized light and polarized image capturing has been proposed. For example, Patent Document No. 1 discloses an endoscope that includes a polarized light source section that irradiates an object with light having a particular polarization component and a light receiving section and that generates a shape variation image representing a variation in the surface shape of the object. The light receiving section of that endoscope receives light with a particular polarization component that is included in the light returning from the object and light with a different polarization component from the particular one that is also included in the returning light. The image capturing section disclosed in Patent Document No. 1 includes an RGB color mosaic and polarizers, which are arranged so that their polarization transmission axes face three different directions. Patent Document No. 1 says that to allow the viewer to easily recognize the surface microfacets of the mucosa, in particular, a polarization property calculating section calculates a polarization orientation and can generate a two-dimensional distribution of surface tilt information.

CITATION LIST

Patent Literature

Patent Document No. 1: Japanese Laid-Open Patent Publication No. 2009-246770
Patent Document No. 2: Japanese Laid-Open Patent Publication No. 11-313242
Patent Document No. 3: United States Laid-Open Patent Publication No. 2009/0079982
Patent Document No. 4: Japanese Laid-Open Patent Publication No. 2007-86720
Patent Document No. 5: PCT International Application Publication No. 2008/149489

Non-Patent Literature

Non-Patent Document No. 1: Nicolas Lefaudeux et al., "Compact and robust linear Stokes polarization camera", Proc. of SPIE, Vol. 6972, 69720B, Polarization: Measurement, Analysis, and Remote Sensing VIII (2008);
Non-Patent Document No. 2: Gary A. Atkinson, Edwin R. Hancock: "Recovery of Surface Orientation from Diffuse Polarization", IEEE Transactions of Image Processing, Vol. 15, No. 6, June 2006, pp. 1653-1664.
Non-Patent Document No. 3: Daisuke Miyazaki and Katsushi Ikeuchi, "Measuring Surface Shape of Transparent Objects from the Analysis of Parabolic Curves and Polarization", Journal of Information Processing, Vol. 44, No. SIG 9 (CVIM 7), July 2003, pp. 86-93

SUMMARY

The prior art technique needs further improvement in view of image quality.

One non-limiting, and exemplary embodiment provides a technique to an image processing apparatus that can obtain polarization information on a pixel-by-pixel basis and that can get information about the object's surface microfacets based on that polarization information.

In one general aspect, an image processing apparatus disclosed herein comprises: a polarized light source section that sequentially illuminates an object with three or more kinds of plane polarized light rays, of which the planes of polarization have mutually different angles; an image capturing section that sequentially captures an image of the object that is being illuminated with each of the three or more kinds of plane polarized light rays and directly receives light that is returning from the object by way of no polarizers, thereby getting an intensity value; a varying intensity processing section that obtains a relation between the angle of the plane of polarization and the intensity value of each pixel based on a signal representing the intensity value supplied from the image capturing section, thereby generating an intensity maximizing angle image that is defined by the angle of the plane of polarization that maximizes the intensity value with respect to each said pixel and a degree of intensity modulation image that is defined by the ratio of the amplitude of variation in the intensity value caused by the change of the plane of polarization to an average intensity value with respect to each said pixel; and a normal estimating section that estimates, based on the intensity maximizing angle image and the degree of intensity modulation image, a normal to a tilted surface in a V-groove on the object's surface on a pixel-by-pixel basis.

In another aspect, an image processing method disclosed herein comprises the steps of: sequentially illuminating an object with three or more kinds of plane polarized light rays, of which the planes of polarization have mutually different angles; sequentially capturing an image of the object when the object is being illuminated with each of the three or more kinds of plane polarized light rays and directly receiving light that is returning from the object by way of no polarizers, thereby getting an intensity value; obtaining a relation between the angle of the plane of polarization and the intensity value of each pixel, thereby generating an intensity maximizing angle image that is defined by the angle of the plane of polarization that maximizes the intensity value with respect to each said pixel and a degree of intensity modulation image that is defined by the ratio of the amplitude of variation in the intensity value caused by the change of the plane of polarization to an average intensity value with respect to each said pixel; and estimating, based on the intensity maximizing angle image and the degree of intensity modulation image, a normal to a tilted surface in a V-groove on the object's surface on a pixel-by-pixel basis.

In another aspect, an image processing processor disclosed herein receives a plurality of polarized images, where the plane of polarization of a plane polarized light ray with which an object is illuminated has three or more different angles, and estimates, through image processing, a normal to a tilted surface in a V-groove on the object's surface on a pixel-by-pixel basis. The image processing processor performs the steps of: obtaining a relation between the angle of the plane of polarization and the intensity value of each pixel based on the polarized images, thereby generating an intensity maximizing angle image that is defined by the angle of the plane of polarization that maximizes the intensity value with respect to each said pixel and a degree of intensity modulation image that is defined by the ratio of the amplitude of variation in the intensity value caused by the change of the plane of polarization to an average intensity value with respect to each said pixel; and estimating, based on the intensity maximizing angle image and the degree of intensity modulation image, a normal to the tilted surface in the V-groove on the object's surface on a pixel-by-pixel basis.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIGS. 4(a) and 4(b) illustrate an exemplary arrangement of photosensitive cells in an image sensor for use in the first embodiment of the present disclosure.

FIG. 7B schematic representations illustrating how intensity pattern images change as the polarization plane of a polarized light source rotates.

FIGS. 13(a), 13(b) and 13(c) illustrate a groove on the object's surface as viewed from right over that surface.

FIG. 15 illustrates a situation where non-polarized light is incident on a groove and reflected light is produced parallel and perpendicularly to the azimuth angle $\psi$ of the groove.

FIG. 19C is a flowchart showing how to solve the ambiguity of the azimuth angle $\psi$ of a normal.

FIG. 21(a) shows the result of an experiment in which a lenticular lens plate was used as an object and 21(b) schematically illustrates a part of the portion 21(a) on a larger scale.

DETAILED DESCRIPTION

Figure 1A:
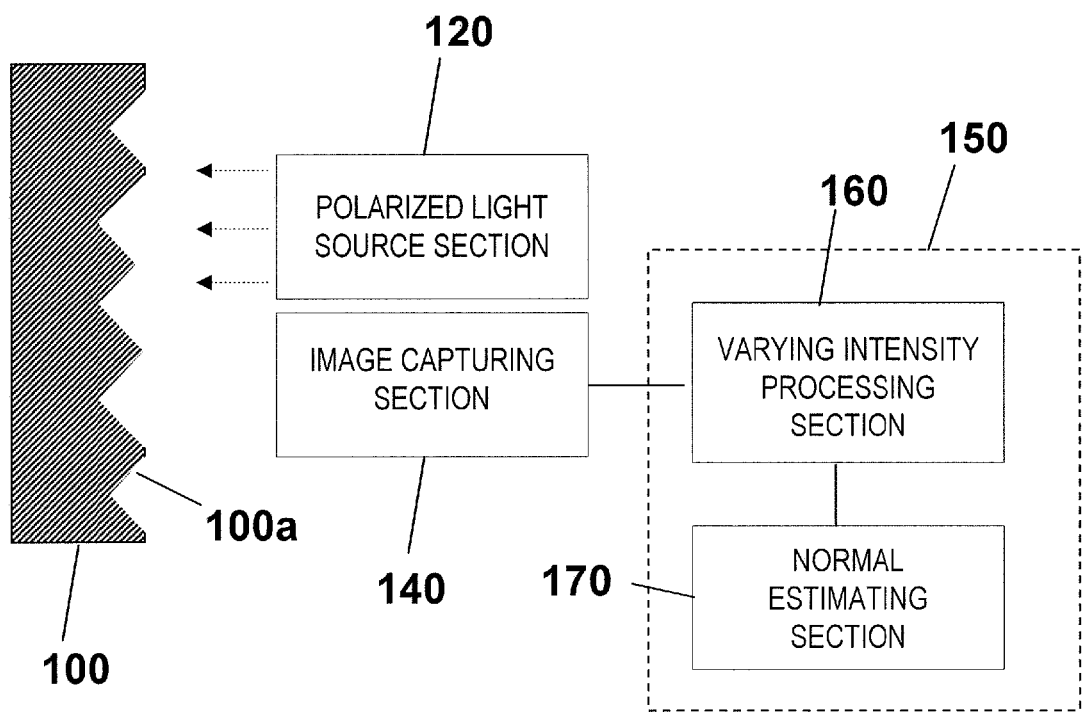
FIG. 1A Illustrates an exemplary configuration for an image processing apparatus according to the present disclosure.

The present inventors discovered via experiments that the image capturing section disclosed in Cited Reference #1 could not get accurate polarization information on a pixel-by-pixel basis. On top of that, a noticeable moiré pattern would be generated in the polarized image due to interference with the spatial frequency of the object and part of the color mosaic would turn into a polarization mosaic, thus debasing the quality of a full-color image reproduced, too.

In one general aspect, an image processing apparatus disclosed herein comprises: a polarized light source section that sequentially illuminates an object with three or more kinds of plane polarized light rays, of which the planes of polarization have mutually different angles; an image capturing section that sequentially captures an image of the object that is being illuminated with each of the three or more kinds of plane polarized light rays and directly receives light that is returning from the object by way of no polarizers, thereby getting an intensity value; a varying intensity processing section that obtains a relation between the angle of the plane of polarization and the intensity value of each pixel based on a signal representing the intensity value supplied from the image capturing section, thereby generating an intensity maximizing angle image that is defined by the angle of the plane of polarization that maximizes the intensity value with respect to each said pixel and a degree of intensity modulation image that is defined by the ratio of the amplitude of variation in the intensity value caused by the change of the plane of polarization to an average intensity value with respect to each said pixel; and a normal estimating section that estimates, based on the intensity maximizing angle image and the degree of intensity modulation image, a normal to a tilted surface in a V-groove on the object's surface on a pixel-by-pixel basis.

In one embodiment, the normal estimating section includes: an azimuth angle processing section that obtains candidates for the azimuth angle of the normal based on the intensity maximizing angle image; a zenith angle processing section that obtains the zenith angle of the normal based on the degree of intensity modulation image; and an azimuth angle ambiguity processing section that chooses one among those candidates for the azimuth angle of the normal.

In one embodiment, the image processing apparatus includes a normal image generating section that generates an image of the normal that has been estimated by the normal estimating section.

In one embodiment, the azimuth angle ambiguity processing section chooses one among those candidates for the azimuth angle of the normal by reference to either a non-polarized light intensity image corresponding to an image under non-polarized light or the degree of intensity modulation image.

In one embodiment, the varying intensity processing section adds together the multiple light intensity images that have been obtained by the image capturing section and calculates their average, thereby generating and giving the non-polarized light intensity image to the azimuth angle ambiguity processing section.

In one embodiment, the azimuth angle ambiguity processing section chooses one among those candidates for the azimuth angle of the normal based on at least one of the respective spatial gradient vectors of the non-polarized light intensity image and the degree of intensity modulation image.

In one embodiment, the polarized light source section and the image capturing section are attached to an endoscope.

In one embodiment, the polarized light source section gets non-polarized light transmitted through a plane of polarization changer that is able to change planes of polarization, thereby radiating plane polarized light rays, of which the plane of polarization sequentially changes into one of three or more different types after another.

In one embodiment, an angle of 15 degrees or less is defined between the respective optical axes of the polarized light source and the image capturing section.

In one embodiment, the image capturing section includes either a monochrome image sensor or a color image sensor.

In one embodiment, the image processing apparatus includes: an illuminating direction setting section that virtually changes freely the illuminating direction of the object; and a light intensity image generating section that generates, based on the output of the normal estimating section, a light intensity image of the object being illuminated in the illuminating direction.

In one embodiment, the polarized light source section includes, on its output stage, a spectral filter that transmits light falling within a wavelength range associated with a reflectance at which the spectral reflectance characteristic at the object's surface reaches a local minimum.

In one embodiment, the polarized light source section includes: a ring light source that radiates non-polarized light; and a ring plane of polarization changer that transforms the non-polarized light radiated from the ring light source into the plane polarized light ray and that is able to change the angle of the plane of polarization of the plane polarized light ray sequentially.

In another aspect, an image processing method disclosed herein comprises the steps of: sequentially illuminating an object with three or more kinds of plane polarized light rays, of which the planes of polarization have mutually different angles; sequentially capturing an image of the object when the object is being illuminated with each of the three or more kinds of plane polarized light rays and directly receiving light that is returning from the object by way of no polarizers, thereby getting an intensity value; obtaining a relation between the angle of the plane of polarization and the intensity value of each pixel, thereby generating an intensity maximizing angle image that is defined by the angle of the plane of polarization that maximizes the intensity value with respect to each said pixel and a degree of intensity modulation image that is defined by the ratio of the amplitude of variation in the intensity value caused by the change of the plane of polarization to an average intensity value with respect to each said pixel; and estimating, based on the intensity maximizing angle image and the degree of intensity modulation image, a normal to a tilted surface in a V-groove on the object's surface on a pixel-by-pixel basis.

In another aspect, an image processing processor disclosed herein receives a plurality of polarized images, where the plane of polarization of a plane polarized light ray with which an object is illuminated has three or more different angles, and estimates, through image processing, a normal to a tilted surface in a V-groove on the object's surface on a pixel-bypixel basis. The image processing processor performs the steps of: obtaining a relation between the angle of the plane of polarization and the intensity value of each pixel based on the polarized images, thereby generating an intensity maximizing angle image that is defined by the angle of the plane of polarization that maximizes the intensity value with respect to each said pixel and a degree of intensity modulation image that is defined by the ratio of the amplitude of variation in the intensity value caused by the change of the plane of polarization to an average intensity value with respect to each said pixel; and estimating, based on the intensity maximizing angle image and the degree of intensity modulation image, a normal to the tilted surface in the V-groove on the object's surface on a pixel-by-pixel basis.

As shown in FIG. 1A, an exemplary image processing apparatus according to the present invention includes a polarized light source section 120, an image capturing section 140, a varying intensity processing section 160, and a normal estimating section 170. The varying intensity processing section 160 and the normal estimating section 170 are included in an image processing section 150.

The polarized light source section 120 sequentially illuminates an object 100 with three or more kinds of plane polarized light rays, of which the planes of polarization have mutually different angles. On the surface of the object 100 of shooting according to the present invention, there are multiple grooves 100a. If the object 100 is the surface of an organism's organ, for example, multiple grooves are observed. A plane polarized light ray is reflected by the groove 100a on the surface of the object 100 and then incident on the image capturing section 140. When the object 100 is being illuminated with each of the three or more kinds of plane polarized light rays, the image capturing section 140 shoots the object 100 sequentially. In the meantime, the image capturing section 140 receives the light returning from the object by way of no polarizers, thereby getting an intensity value.

In this description, the "returning light" refers herein to a part of the light that has been emitted from the polarized light source section 120, reflected from the surface of the object 100 and then incident on the image capturing section 140. To illuminate the inside of the grooves 100a on the surface of the object 100 with the light that has been radiated from the polarized light source 120, the angle defined between the respective optical axes of the polarized light source section 120 and the image capturing section 140 may be not too large. Specifically, that angle defined between the respective optical axes of the polarized light source section 120 and the image capturing section 140 may be set to be 15 degrees or less.

Figure 1B:
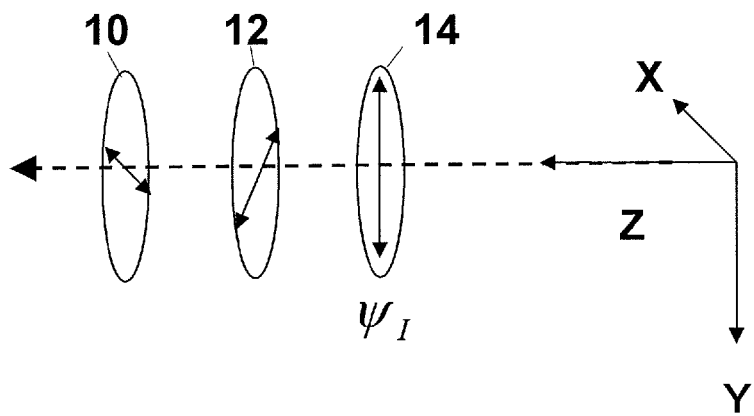
FIG. 1B shows polarization states of a polarized light source.

FIG. 1B is a perspective view schematically showing the polarization directions of three kinds of plane polarized light rays, of which the planes of polarization have mutually different angles. The three polarization states 10, 12 and 14 illustrated in FIG. 1B have planes of polarization that have mutually different angles. Inside each of these circles schematically illustrating the respective polarization states 10, 12 and 14 in FIG. 1B, shown is a double-headed arrow, which indicates the vibration direction of the electric vector that defines the plane of polarization of a plane polarized light ray.

The XYZ coordinates shown in FIG. 1B are of the right-handed system. In this description, the X- and Y-axes are defined in the plane of the image captured by the image capturing section 140, and the direction of the Z-axis is defined to be the viewing direction (i.e., the optical axis direction). The plane of polarization of a plane polarized light ray is a plane that is parallel to the vibrating electric field vector and that includes the optical axis. If this coordinate system is adopted, the electric field vector vibration direction of the plane polarized light ray is parallel to the XY plane. That is why the angle ($\psi I$) of the plane of polarization is defined to be the angle formed by the polarization direction (i.e., the electric vector vibration direction) with respect to the positive X-axis direction. This angle $\psi I$ will be described in detail later with reference to FIG. 3.

According to the present invention, the polarized light source section 120 sequentially illuminates the object 100 with three or more kinds of plane polarized light rays, of which the planes of polarization have mutually different angles. And while the object 100 is being illuminated with each of the three or more kinds of plane polarized light rays, the image capturing section 140 shoots the object 100 sequentially. In the meantime, the image capturing section 140 receives the light returning from the object by way of no polarizers, thereby getting an intensity value.

Now let's go back to FIG. 1A. The varying intensity processing section 160 obtains a relation between the angle of the plane of polarization and the intensity value of each pixel based on a signal representing the intensity value supplied from the image capturing section 140, thereby generating an "intensity maximizing angle image" and a "degree of intensity modulation image". In this description, the "intensity maximizing angle image" is an image that is defined by the angle of the plane of polarization that maximizes the intensity value with respect to each of the pixels that form the image captured. For example, if the intensity value of a pixel P (x, y) that is defined by a set of coordinates (x, y) becomes maximum when the object 100 is illuminated with a plane polarized light ray, of which the plane of polarization has an angle of 45 degrees, then an intensity maximizing angle of 45 degrees is set with respect to that pixel P (x, y). A single "intensity maximizing angle image" is formed by setting such an intensity maximizing angle value for each pixel. On the other hand, the "degree of intensity modulation image" is an image that is defined by the ratio of the amplitude of variation in the intensity value caused by the change of the plane of polarization to an average intensity value with respect to each pixel. Specifically, if the degree of intensity modulation with respect to a certain pixel P (x, y) is 0.3, then the value of 0.3 is set for that pixel P (x, y). A single "degree of intensity modulation image" is formed by setting such a degree of intensity modulation value for each pixel.

As can be seen, in this description, an "image" refers herein to not only a light intensity image to be directly sensible to human vison but also any arrangement of numerical values that are allocated to respective pixels. For example, if a single "intensity maximizing angle image" is displayed, the image can be displayed with lightness defined by the intensity maximizing angle value that has been set for each pixel of that intensity maximizing angle image. The intensity maximizing angle image represented in this manner does include a bright and dark pattern that is sensible to human eyes but that is different from an ordinary light intensity image representing the object's intensity. It should be noted that the data itself that represents any of various kinds of "images" will also be sometimes referred to herein as an "image" for the sake of simplicity.

The normal estimating section 170 shown in FIG. 1A estimates, based on the intensity maximizing angle image and the degree of intensity modulation image, a normal to a tilted surface in a V-groove 100a on the object's (100) surface on a pixel-by-pixel basis. When the V-groove 100a is viewed straight on, the azimuth angle of a normal to a tilted surface in that V-groove 100a is perpendicular to the direction in which the V-groove 100a runs. In one embodiment of the present invention, first of all, the direction of the V-groove 100a, i.e., the azimuth angle of a normal to a tilted surface in the V-groove 100a, is determined. After that, the zenith angle of the normal to the tilted surface in the V-groove 100a is determined. It will be described in detail later exactly on what principle the normal estimating section 170 of the present invention estimates the normal to the tilted surface in the V-groove 100a on a pixel-by-pixel basis.

Embodiment 1

Figure 1C:
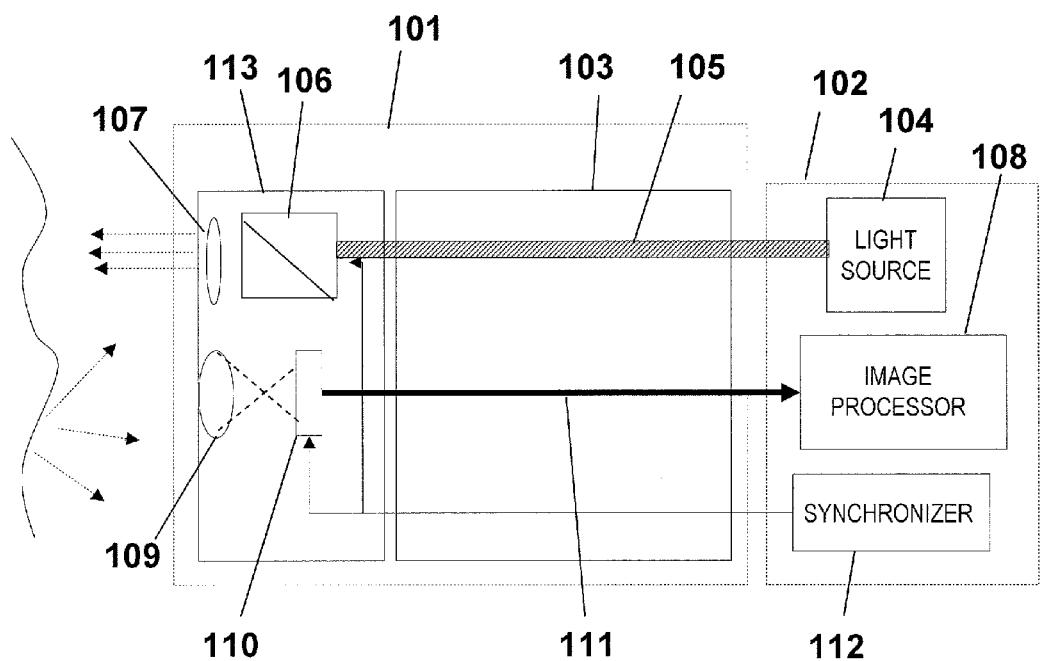
FIG. 1C illustrates a configuration for an image processing apparatus as a first embodiment of the present disclosure.

FIG. 1C schematically illustrates an overall configuration for an image processing apparatus as a first embodiment of the present invention.

This image processing apparatus includes an endoscope 101 and a controller 102. The endoscope 101 includes a tip portion 113 with an image capturing sensor and an inserting portion 103 with a light guide 105 and a video signal line 111. The inserting portion 103 of the endoscope 101 actually has a structure that is more elongated horizontally than in FIG. 1C and that can be bent flexibly. Even when bent, the light guide 106 can also propagate light. It should be noted that there are two types of endoscopes, that is, a flexible scope with a flexible inserting portion 103 such as the one of this embodiment and a rigid scope with an inflexible inserting portion. In the rigid scope that is the other type of an endoscope, its inserting portion 103 has a structure for guiding returning light to an image sensor, which is located behind it, using a relay optical system, for example. The present invention is applicable to both a flexible scope and a rigid scope.

The controller 102 includes a light source 104, an image processing processor 108 and a synchronizer 112. The white non-polarized light that has been emitted from the light source 104 is guided through the light guide 105 to a plane of polarization control element 106 of the tip portion 113. The plane of polarization control element 106 may be made up of a polarizer and a liquid crystal element and can transform the non-polarized light into plane polarized light with an arbitrary plane of polarization using a voltage.

The plane of polarization control element 106 is a device that can rotate the plane of polarization using a liquid crystal material. Its exemplary configurations are already disclosed in Patent Documents Nos. 2 and 3, Non-Patent Document No. 1 and so on. The plane of polarization control element 106 may be implemented as a voltage application type liquid crystal device that includes a ferroelectric liquid crystal material, a polarization film and a quarter-wave plate in combination. The plane of polarization control element 106 transforms the non-polarized light that has been produced by the light source 104 and then transmitted through the light guide 105 into plane polarized light that has a plane of polarization at an arbitrary angle.

The synchronizer 112 gives the plane of polarization control element 106 an instruction to rotate the plane of polarization, thereby getting the plane of polarization of the illumination rotated. And that polarized illumination is cast toward the object through an illuminating lens 107. At the same time, the synchronizer 112 sends a shooting start signal to an image sensor 110, thereby getting video. The synchronizer 112 performs this series of processing steps a number of times.

The light returning from the object is transmitted through a shooting lens 109 and then produces an image on the image sensor 110. This image sensor 110 may be either a monochrome image sensor or a single-panel color image sensor with a color mosaic. The video signal of the captured image is transmitted through the video signal line 111 to reach the image processor 108.

In this embodiment, the polarized light source section 120 shown in FIG. 1A is realized by the light source 104, the light guide 105, the plane of polarization control element 106 and the illuminating lens 107. Meanwhile, the image capturing section 140 shown in FIG. 1A is realized by the shooting lens 109 and the image sensor 110. And the varying intensity processing section 160 and the normal estimating section 170 shown in FIG. 1A are realized by the image processor 108.

Figure 2:
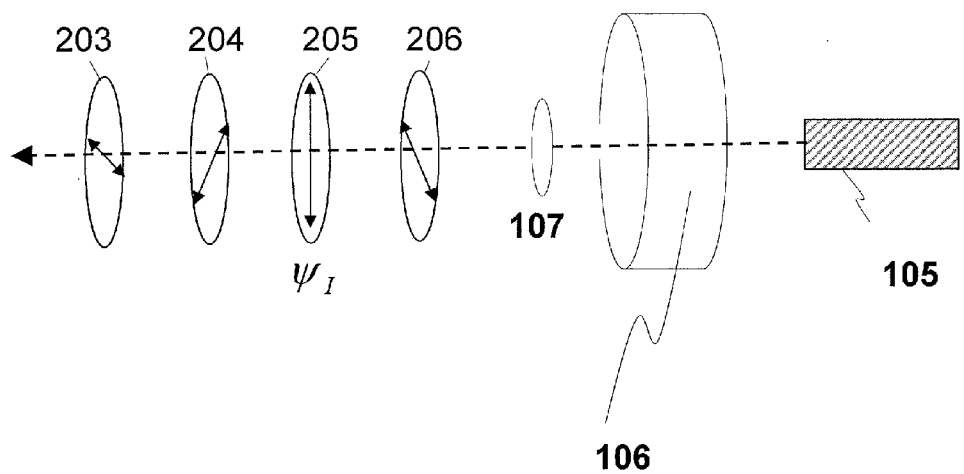
FIG. 2 shows how a plane of polarization control element operates.

Next, it will be described with reference to FIG. 2 how the plane of polarization control element 106 operates.

First, second, third and fourth images are captured in respective states 203, 204, 205 and 206 in which the plane of polarization has an angle of 0, 45, 90 and 135 degrees, respectively. These angles do not always have to be increased on a 45 degree basis. But the angle of increment may also be any other value obtained by dividing 180 degrees by an integer of three or more. If the image sensor has high sensitivity or if the illumination has high illuminance, then the exposure process time can be shortened. As a result, the angle of rotation can be set more finely.

According to the documents described above, the time it takes to rotate the plane of polarization may be as long as approximately 20 ms when the operating speed is low but may also be as short as 40 to 100µ sec when the operating speed is high. If a high-response-speed liquid crystal material is used and if the sensitivity of the image sensor is increased to a level that is high enough to get an image captured in such a short time, performance that is high enough to shoot a moving picture can be maintained even when the plane of polarization is rotated to those four directions one after another during shooting.

As can be seen easily from FIG. 1C, the optical axis of the illuminating lens 107 is substantially aligned with that of the shooting lens 109. This arrangement is adopted in order to avoid casting shadows on the object as perfectly as possible when the object is monitored with an endoscope.

It should be noted that when an endoscope is used normally, the object can be irradiated with non-polarized light in many cases. According to the present invention, by adding together mutually different images as the first through fourth images, for example, a non-polarized average light intensity image can be generated. The present inventors discovered via experiments that when the images represented by multiple polarized light rays, of which the planes of polarization were defined by angles ψI at regular intervals and which had been radiated toward, and had returned from, the object were added together, the effect of polarization was canceled and the effect eventually achieved was the same as the one achieved by using a non-polarized light source.

Figure 3:
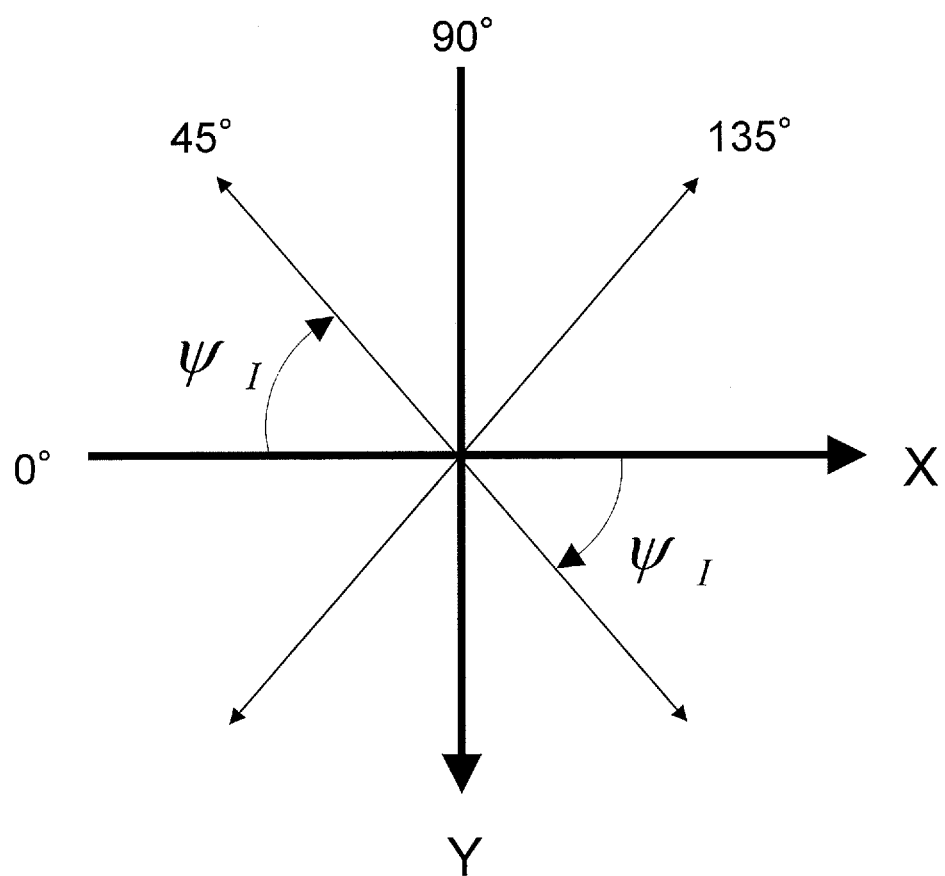
FIG. 3 shows how to define the angle of a plane of polarization.

FIG. 3 shows how the plane of polarization of polarized light source has its angle ψI defined. As described above, an X-Y coordinate system is defined with respect to the object. In this case, the angle ψI is defined to be positive in the positive Y-axis direction with the negative X-axis direction set to be 0 degrees. If the angle ψI is saved for reflected light, then the respective planes of polarization of the reflected light and the incident light will have the same angle. And if the angle ψI of the plane of polarization is going to be increased or decreased, the same polarization state will recur over and over again in a period of 180 degrees. That is to say, a function that uses the angle of the plane of polarization as a variable is a periodic function that has a period of 180 degrees. In this description, the angle ψI of the plane of polarization of polarized light source will be sometimes referred to herein as an "incident plane of polarization angle".

FIGS. 4(a) and 4(b) illustrate an exemplary arrangement for the image capturing plane of the image sensor 110. As shown in FIG. 4(a), a number of photosensitive cells (i.e., photodiodes) are arranged in columns and rows on the image capturing plane. When a color image is going to be captured, color mosaic filters, which transmit light rays with three different wavelengths associated with RGB, are arranged as shown in FIG. 4(b). Each of these photosensitive cells generates, by photoelectric conversion, an electrical signal representing the quantity of the light received. In this manner, a conventional image sensor to capture a light intensity image may be used as the image sensor 110. In this embodiment, if the illumination is plane polarized light, an image is captured with its plane of polarization rotated, thereby obtaining information about the object's surface.

As a method for getting a color image and a polarized image at the same time, not only the method in which the acquisition of the polarized image is developed on the time axis as is done in the present invention but also a so-called "color plane sequential" method in which the color image capturing is developed on the time axis could be adopted as well.

Figure 5:
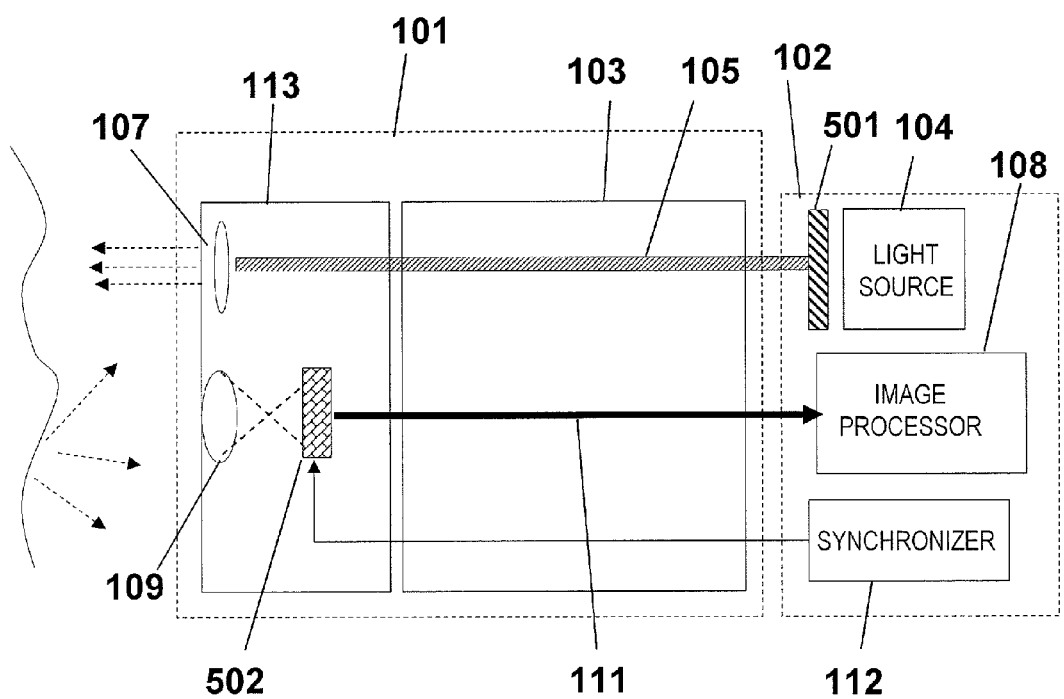
FIG. 5 illustrates a configuration for another image processing apparatus that is designed to obtain a color image and a polarized image.

FIG. 5 illustrates an alternative configuration that may be used for such a purpose. Unlike the configuration shown in FIG. 1C, the non-polarized white light emitted from the light source 104 is changed by a rotating color filter 501 into color light, which is sequentially radiated over a period of time. The light guide 105 transmits the color light as it is. The light returning from the object is usually polarized. However, an image sensor to capture a monochrome image may be used. For example, a monochrome polarized image sensor that uses a patterned polarizer as disclosed in Patent Document No. 4 may be used.

Figure 6:
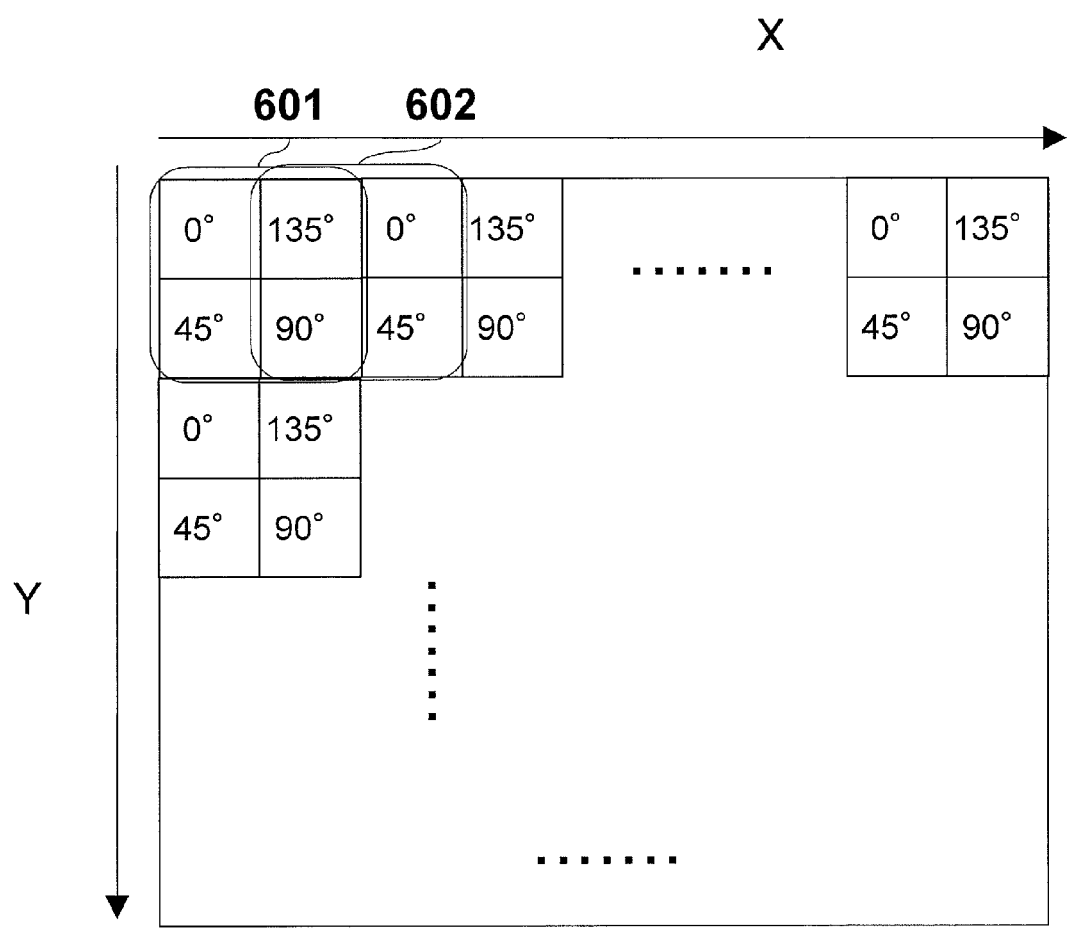
FIG. 6 Illustrates an arrangement of photosensitive cells in the polarized image sensor of the image processing apparatus shown in FIG. 5.

FIG. 6 illustrates an example of a monochrome polarized image sensor in which such a patterned polarizer is arranged. An image sensor like this may be implemented as a polarization imaging element that uses a photonic crystal as disclosed in Patent Document No. 4.

The pattern polarizer of this monochrome polarized image sensor has wavelength dependence, and therefore, cannot obtain a polarized image in the entire wavelength range that covers all of the RGB ranges. For example, if the patterned polarizer is designed adaptively to the B wavelength range, then only a B polarized image can be obtained. Furthermore, to obtain a polarized image (and the degree of polarization and the polarization angle, among other things), a sort of spatial difference processing should be done on a 2×2 cell using a spatially processed image of the polarization mosaic. As a result, moiré will be inevitably produced on the B polarized image due to the influence of that difference processing. Unlike the moiré pattern that has been produced through mere pixel sampling, the moiré pattern produced by using the pattern polarizer has been caused mainly through the spatial image processing to obtain the polarized image as described above. And the present inventors discovered and confirmed via experiments that the moiré pattern produced by using the pattern polarizer was much more noticeable than the moiré pattern produced through normal pixel sampling.

Consequently, with the configuration shown in FIG. 5 adopted, the image quality would be debased significantly when a polarized image is monitored.

On the other hand, according to this embodiment, polarization information can be obtained on a pixel-by-pixel basis using a normal image sensor, and therefore, such a problem can be avoided. That is to say, the image capturing section of this embodiment receives the returning light directly (i.e., by way of no polarizers) and outputs a signal representing an intensity value. On top of that, polarized images can also be obtained for respective wavelength components associated with the three primary colors of RGB, and a polarized image sensor, which would raise the overall cost when required, is no longer necessary, either.

Next, it will be described how the intensity varies when the plane of polarization of polarized light is rotated. In the following example, the object is not the mucosa of an organism's organ but an object made of a general material such as plastic or wood as an example. This example is taken because light is basically specular-reflected from the surface of the mucosa and because reflection can be regarded as the same physical phenomenon irrespective of the material of the object.

Figure 7A:
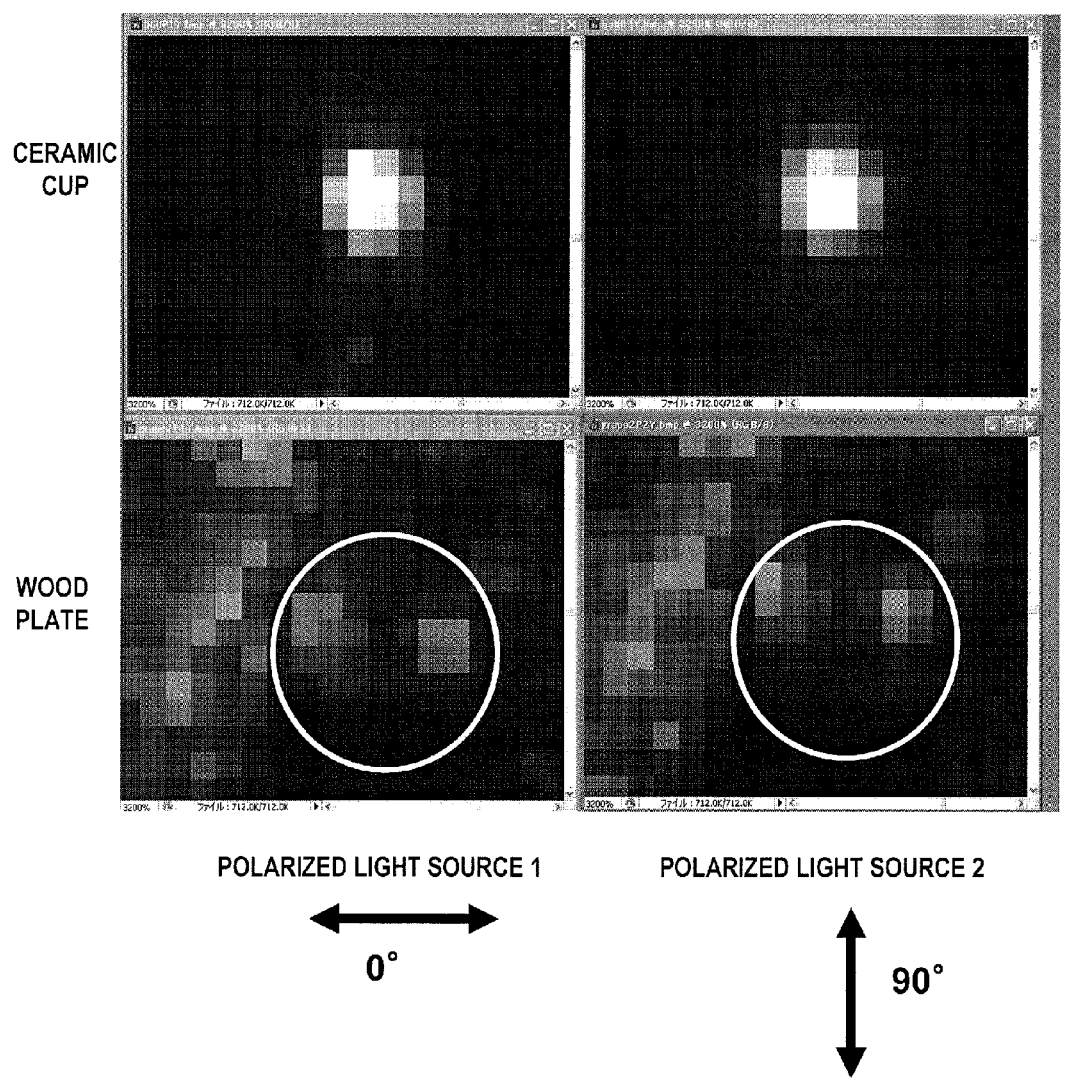
FIG. 7A illustrates how intensity pattern images change as the polarization plane of a polarized light source rotates.

FIGS. 7A and 7B illustrate polarized images of a ceramic cup with a smooth surface and a wood plate with microfacet that were captured as objects by the present inventors. Specifically, the two images on the left-hand side of FIG. 7A are light intensity images that are obtained when the object is illuminated with polarized light with an incident plane of polarization angle ψI of 0 degrees. On the other hand, the two images on the right-hand-side of FIG. 7A are light intensity images that are obtained when the object is illuminated with polarized light with an incident plane of polarization angle ψI of 90 degrees.

Meanwhile, the four images shown in FIG. 7B are schematic representations of the four images shown in FIG. 7A. As can be easily from the images shown at the top of FIGS. 7A and 7B, even if the polarization plane of the polarized light was changed, no significant variation was observed in the intensity pattern of the ceramic cup with the smooth surface. As for the wood plate with a lot of microfacets, on the other hand, it turned out that when the angle ψI of the polarization plane of the polarized light was changed, a significant variation occurred in the light intensity image observed as can be seen easily from the images shown at the bottom of FIGS. 7A and 7B. Such a difference can be explained as follows.

Figure 8:
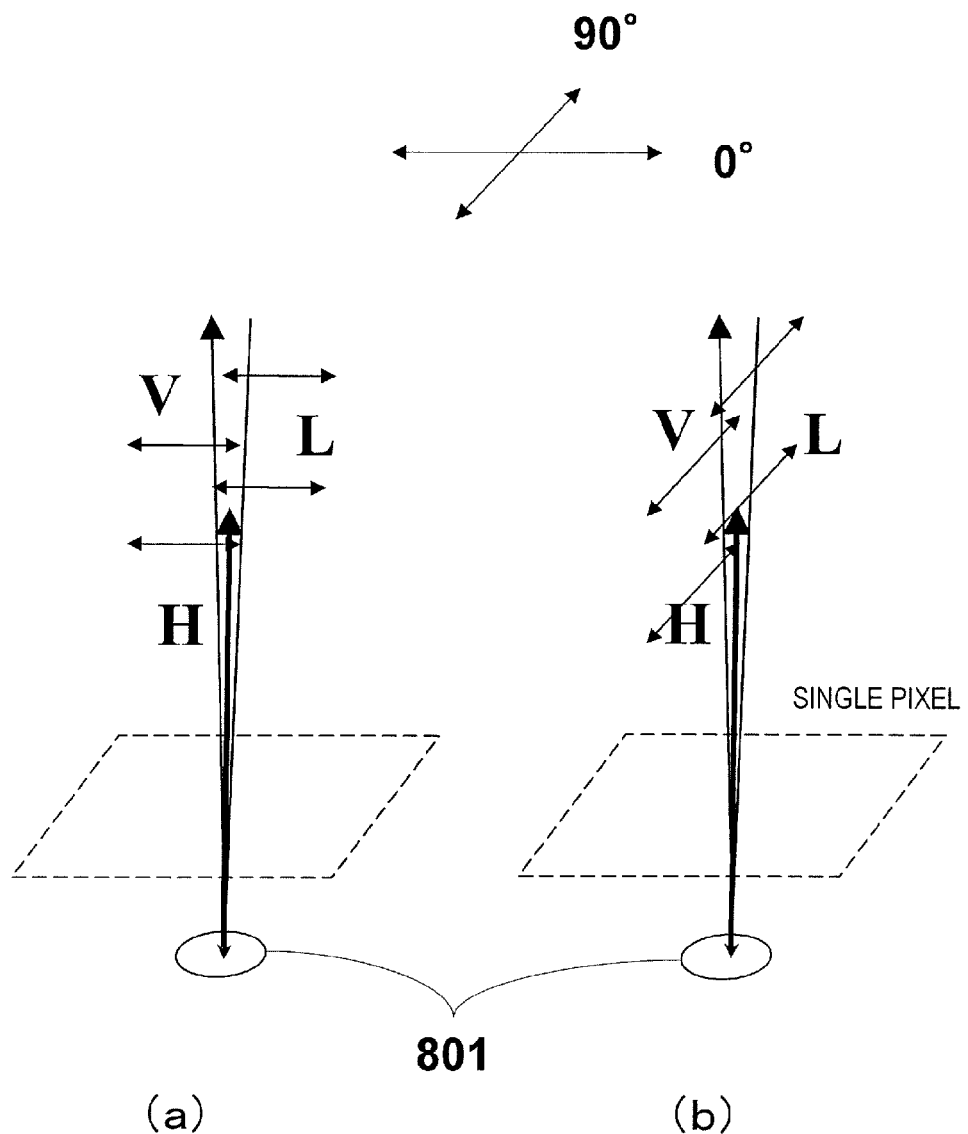
FIGS. 8(a) and 8(b) illustrate how incoming light that has come directly from over an object is incident on the object's surface and reflected once.
Figure 9:
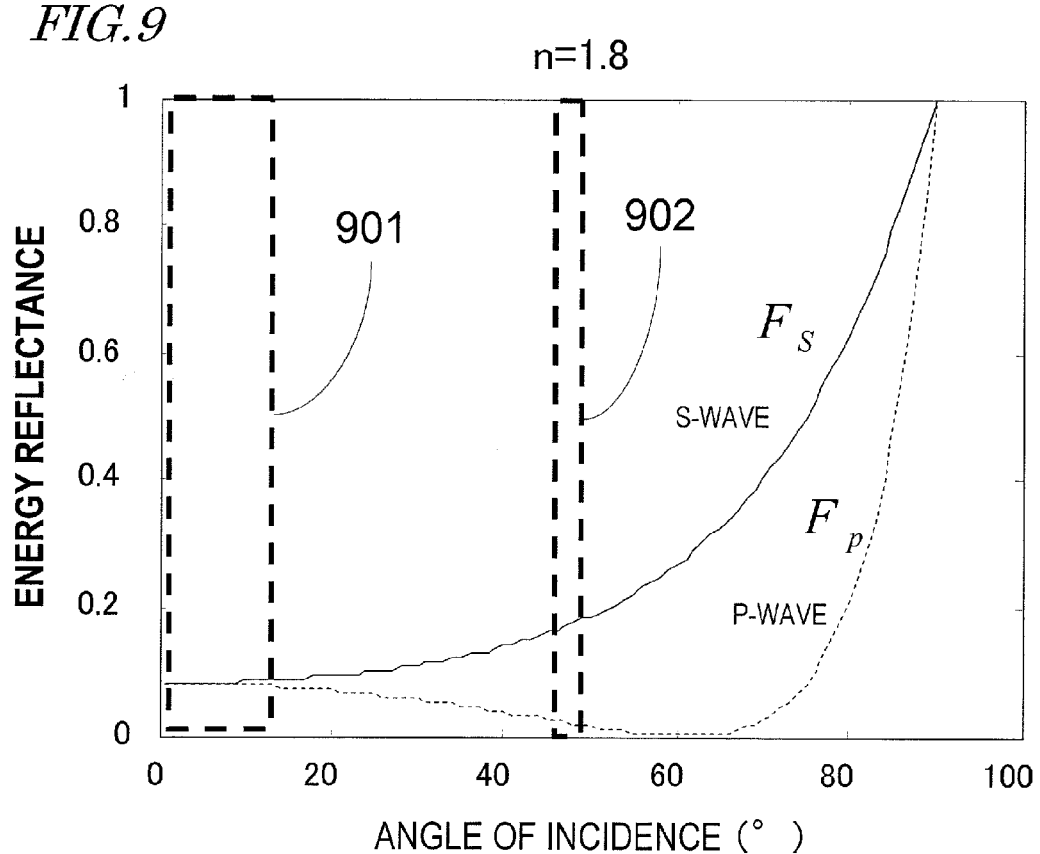
FIG. 9 is a graph showing how the Fresnel reflectances of P- and S-wave energies change with the angle of incidence (that is represented as the abscissa).

FIG. 8 illustrates how polarized light is incident on the surface 801 at an angle of incidence that is close to zero degrees and how the specular reflected light is observed with a camera. The respective angles defined by the polarization planes of the incident polarized light are different from each other by 90 degrees between portions (a) and (b) of FIG. 8. However, even though the reflected plane polarized light travels in a different direction from the incident light, the intensity (i.e., the energy) of the reflected light is almost the same as that of the incident light for the following reasons:

FIG. 9 is a graph showing the dependence of the specular reflectance according to the Fresnel theory on the angle of incidence. In FIG. 9, the abscissa represents the angle of incidence and the ordinate represents the Fresnel reflectance. These dependence curves are drawn on the supposition that the refractive index NN is 1.8. The angles of incidence of around 0 through around 15 degrees, which can be regarded as representing substantially perpendicular incidence, fall within the range 901. As can be seen from this graph, both P and S waves have substantially the same reflectance in this range 901. Therefore, if the polarized light is incident substantially perpendicularly onto the surface, then it makes almost no difference for the surface and the light is reflected in the same behavior, no matter whether the polarized light is actually a P-wave or an S-wave. This fact is satisfied extensively by any natural object with a refractive index n of 1.4 to 2.0.

As described above, if polarized light is incident on a smooth surface at an angle of incidence of almost zero degrees, reflected once and then observed, the energy of the reflected light does not change, and the intensity Y observed does not change, either, even when the plane of polarization of the polarized light is rotated by ψI degrees.

Figure 10A:
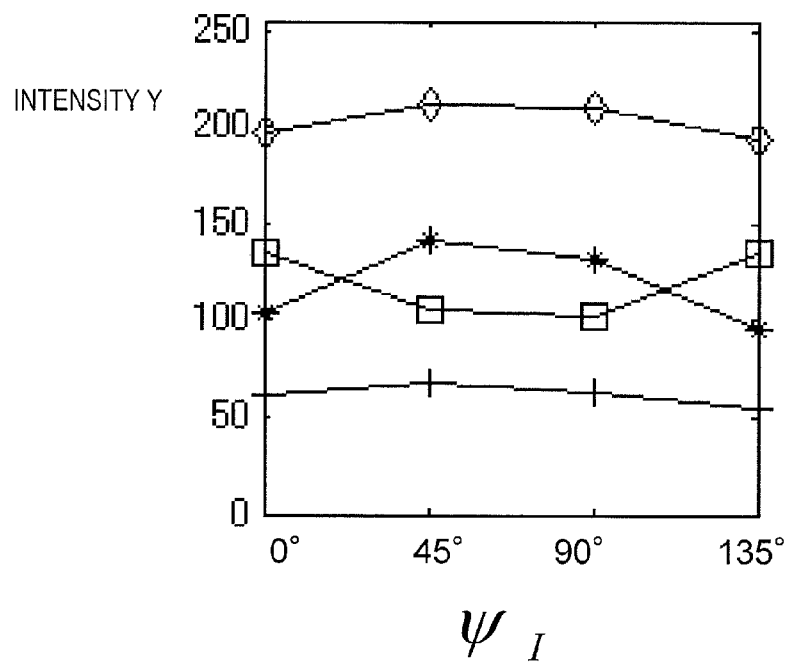
FIG. 10A is a graph showing how the intensity value of a pixel varies as the plane of polarization of polarized light is rotated.
Figure 10B:
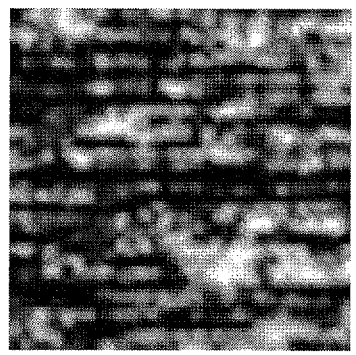
FIG. 10B is a photograph showing the surface shape of a sample that was used to get the data shown in the graph of FIG. 10A.
Figure 10C:
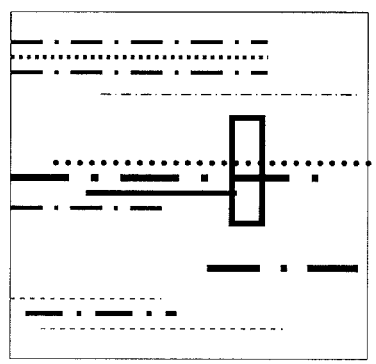
FIG. 10C schematically illustrates the surface shape shown in FIG. 10B.

FIG. 10A is a graph showing how the intensity value of the same pixel varied in a situation where a light intensity image was shot with the plane of polarization of the polarized light, impinging on the surface of a wood plate, changed. FIG. 10B is a light intensity image of that wood plate as the object of shooting (i.e., a light intensity image under non-polarized light). And FIG. 10C schematically illustrates the surface microfacets of the wood plate shown in FIG. 10B.

Figure 11:
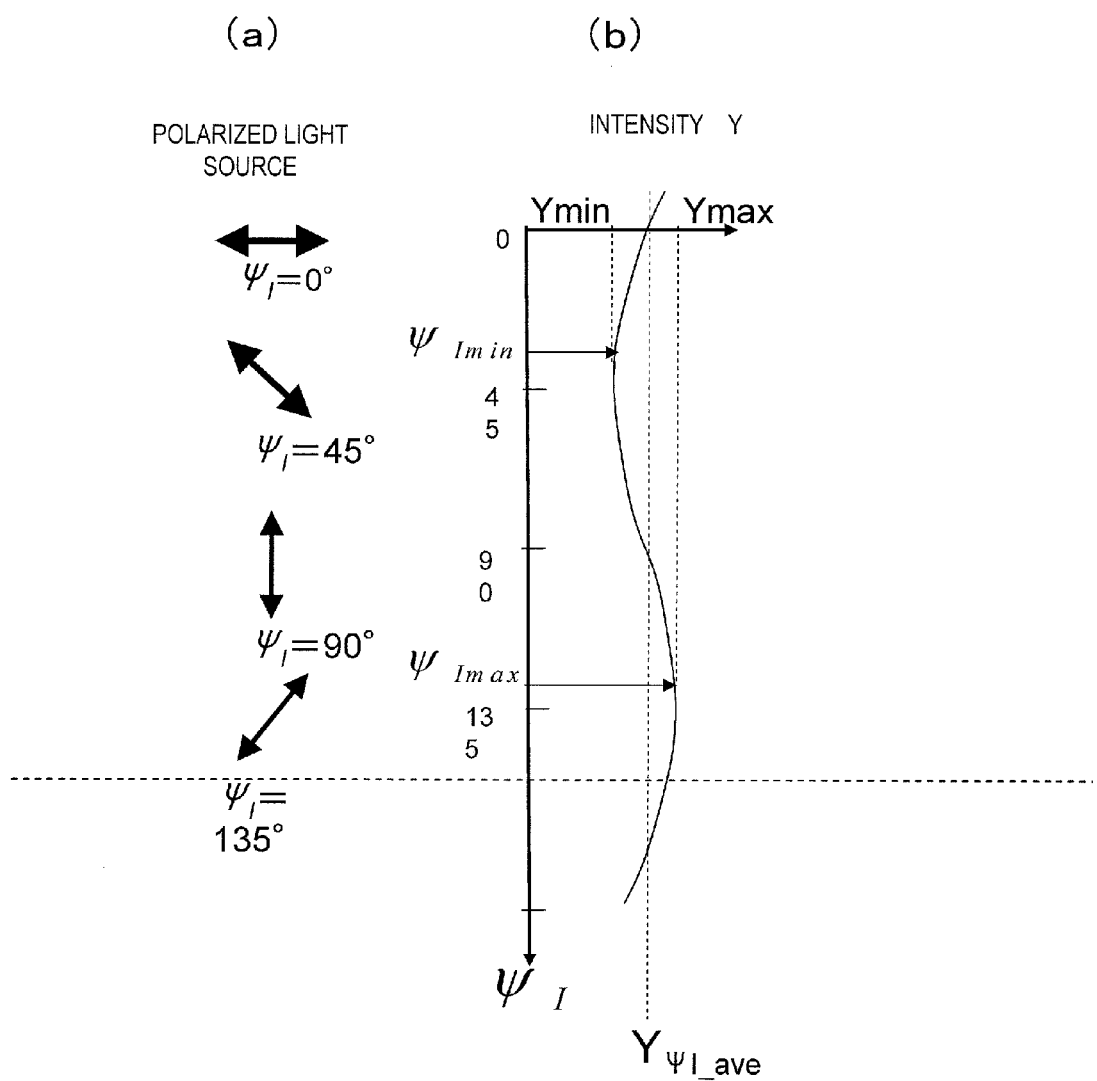
FIG. 11(a) shows the polarization directions of polarized light sources and FIG. 11(b) shows how the light intensity varies according to the polarized light source.

FIG. 11 shows the behavior of the intensities Y of a particular pixel of a light intensity image that were obtained when the plane of polarization of the polarized light had angles ψI of 0, 45, 90 and 135 degrees, respectively. As can be seen from this graph, the intensity Y varied periodically according to the angle ψI of the plane of polarization of each polarized light. The surface of the wood plate is not smooth but has a lot of grooves, where the incident light produces interreflection. Consequently, the intensity Y would vary according to the angle ψI of polarization of the light. The reason will be described in detail below.

Figure 12:
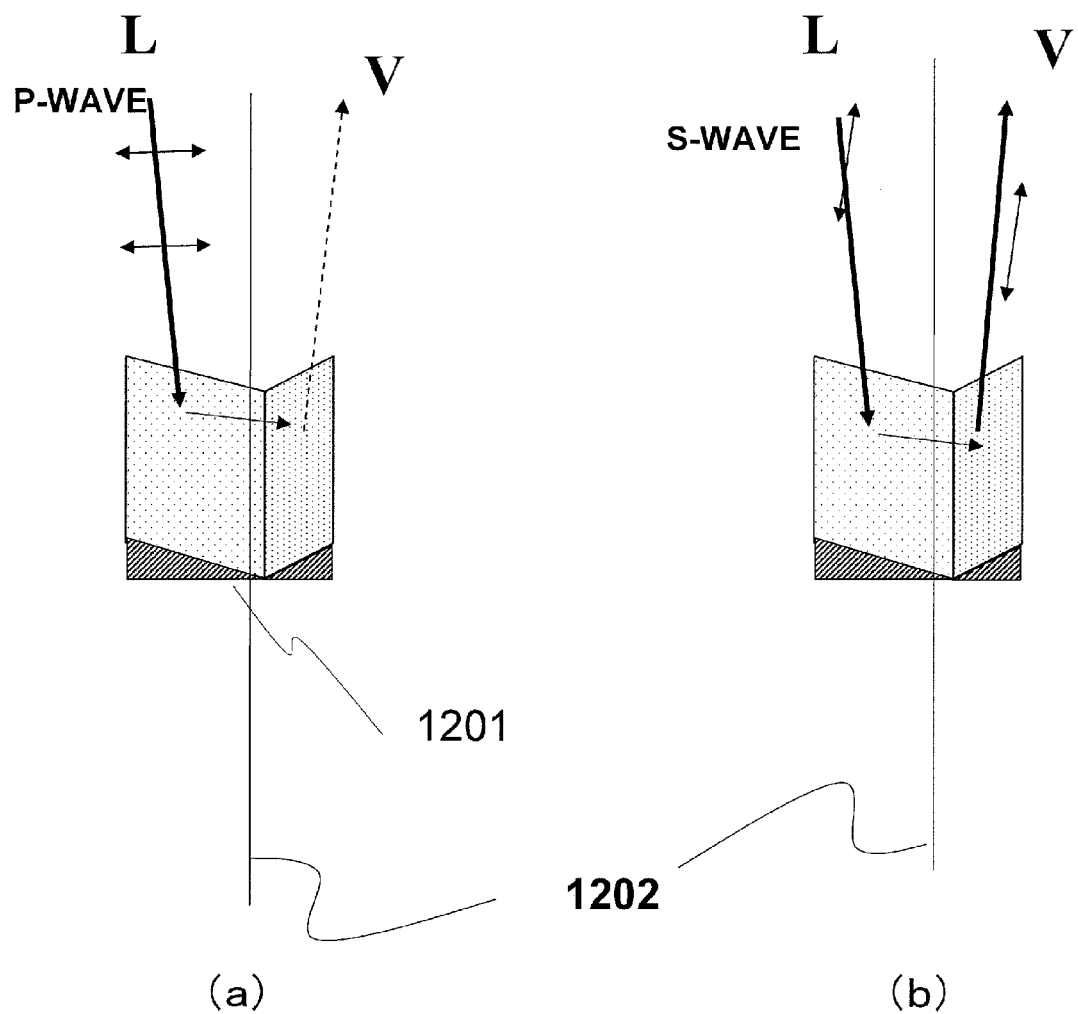
FIGS. 12(a) and 12(b) illustrate how the intensity of polarized reflected light varies due to interreflection.

FIG. 12 illustrates how a groove 1201 that has been formed on a surface produces interreflection twice on its slopes. That kind of interreflection would be produced on an uneven surface of various natural objects including cloth, wood, human skin and leather. In this case, the properties of reflections are important the first and second times around, but the interreflection is almost negligible for the third time and on, because the intensity is small. Thus, in this example, only a situation where the interreflection occurs twice will be described. Generally speaking, if the properties of reflection are roughly classified into specular reflection and diffuse reflection, there arise one of the following four situations:

1) diffuse reflection the $1^{st}$ time around and specular reflection the $2^{nd}$ time around;
2) diffuse reflection both of the $1^{st}$ and $2^{nd}$ times around;
3) specular reflection the $1^{st}$ time around and diffuse reflection the $2^{nd}$ time around; and
4) specular reflection both of the $1^{st}$ and $2^{nd}$ times around.

Among these four situations, in situations 1) and 2), when the light is diffuse-reflected the first time around, the diffuse-reflected light gets non-polarized and is reflected in every direction. However, the results of experiments revealed that when the object was colored and had low intensity, the diffuse reflection component of this first time around was a minor one, which means that a relatively small quantity of light penetrated the object. Rather, the specular reflection in situations 3) and 4), which is complementary to situation 1), prevail over the diffuse reflection according to Fresnel theory. Meanwhile, if diffuse reflection is produced the second time around as in situation 3), it can be seen easily, considering the geometric relation between the incident and reflected light rays, that situation 3) involves situation 4). In that case, no matter whether the degree of polarization or intensity is used as a reference, the major intensity component will be produced by specular reflection.

Consequently, situation 4), in which specular reflection is produced both of the first and second times around, may be regarded as the dominant phenomenon. If the tilted surface in the groove is not quite smooth and if the illumination is not quite parallel light, even specular reflected light is not ideal one. That is why the present inventors confirmed via experiments that even if the specular reflection condition was not satisfied completely, these two reflections could be observed, and the image could be captured, relatively easily and the polarization property was caused by the specular reflection.

Next, look at portions (a) and (b) of FIG. 12, in which illustrated is a portion of a groove 1201 on the surface of an object. On the object's surface, at least a portion of the groove 1201 runs in one direction, which will be referred to herein as the "main axis direction". Actually, however, the groove 1201 does not have to run linearly but may be a curved one, too. Even in such a curved groove, its portion can also be approximated to be a linear groove that runs in the main axis direction.

Figure 22:
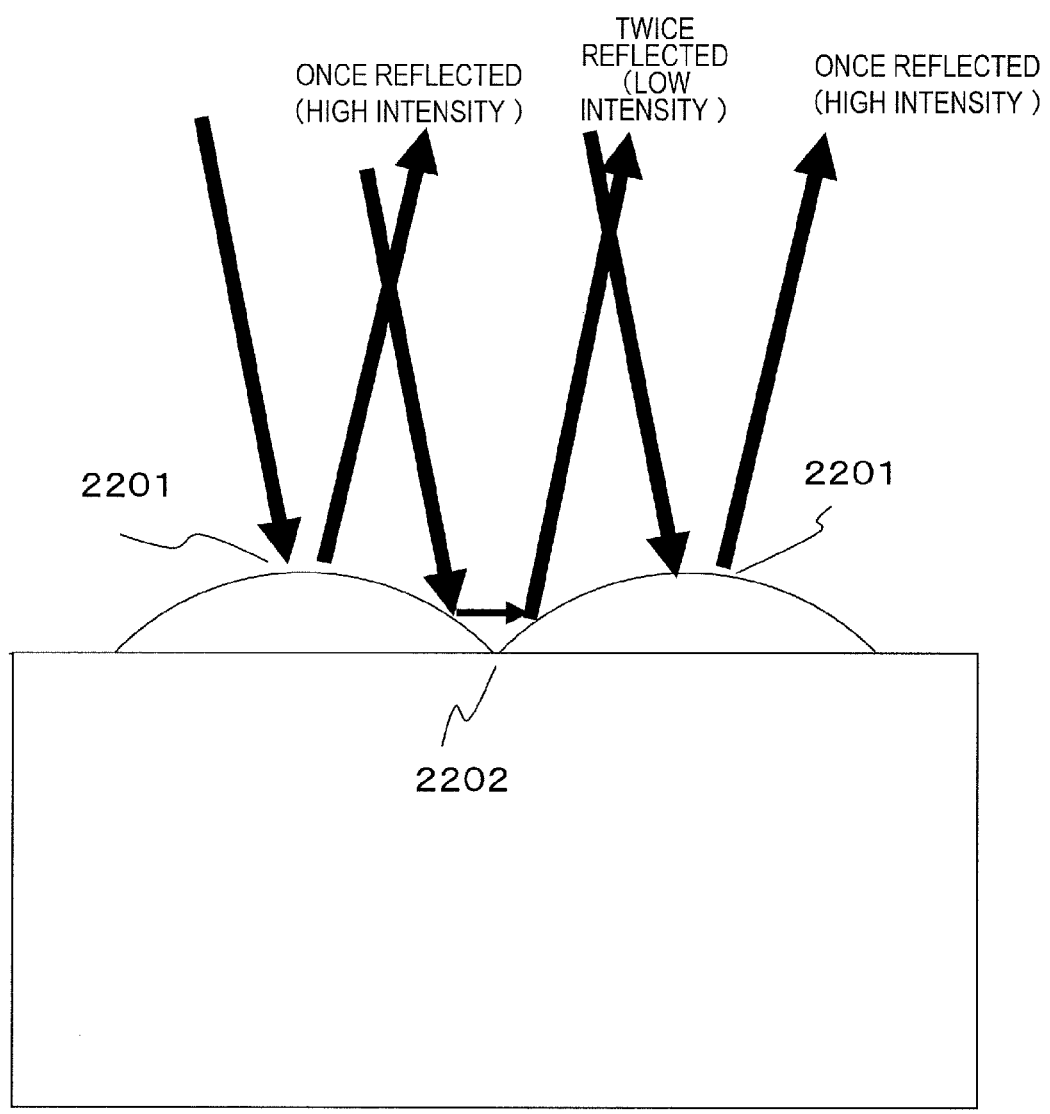
FIG. 22 illustrates how once reflection and twice reflection are produced at a cross section of a lenticular lens plate.

It should be noted that a cross section of the groove 1201 on the object's surface can be approximated to be a V-shape. That is why a groove on the surface of an organism's organ can be called a "V-groove". However, a cross section of such a V-groove does not have to have an exactly V-shape but may have a curved portion, too. In any case, as long as there is a groove with a generally "V-shaped" cross section on the object's surface, the following description is applicable. Likewise, a structure in which a recess interposed between two adjacent raised portions runs in the direction coming out of the paper such as the one to be described later with reference to FIG. 22 is another example of a V-groove.

As shown in portion (a) of FIG. 12, polarized light incident perpendicularly to the main axis direction 1202 of the groove is a P-wave. Look at FIG. 9 again, and it can be seen that if the object's groove 1201 has a tilt angle of approximately 45 degrees and if light is incident from right over the groove 1201, the reflectance of a P-wave becomes much lower than that of an S-wave in the range 902 of that angle of incidence as can be seen from the graph showing the Fresnel reflectance. The reflectance of the P-wave further decreases as the P-wave goes through reflection first and second times around. On the other hand, the S-polarized light shown in portion (b) of FIG. 12 does not have its reflectance decreased so much even after having gone through the reflections first and second times around. As a result, on the plane of polarization of the P-wave that has been incident on the groove, the reflected light comes to have very low energy and decreased intensity. On the other hand, on the incident plane of polarization of the S-wave, the reflected light has not had its energy attenuated so much and still maintains high intensity.

If the surface groove is supposed to be as such, the variation in the intensity of the reflected light that was caused by rotating the plane of polarization of the incident light in an experiment can be accounted for.

The present inventors discovered that the function representing the variation in intensity Y that was caused by getting the polarized light reflected twice from the groove changed in substantially the same way as in a situation where non-polarized light was incident there. Hereinafter, this respect will be described.

FIG. 13(a) illustrates a groove on the object's surface as viewed from right over that surface, which corresponds to looking down on FIG. 12 from right over the paper. In FIG. 13(a), shown are X and Y coordinates on a plane that is parallel to the image capturing plane. Also shown is the angle ψ formed between the direction that intersects at right angles with the main axis direction 1202 of the groove 1201 and the positive X-axis direction. FIG. 13(b) shows the angle ψI of the plane of polarization of the polarized light that has been incident on the object. And FIG. 13(c) illustrates, in combination, what is illustrated in FIGS. 13(a) and 13(b) in the same drawing. In the following description, the direction of the groove will be specified herein by the angle ψ, which is different from the azimuth angle of the groove's main axis by 90 degrees.

Figure 14A:
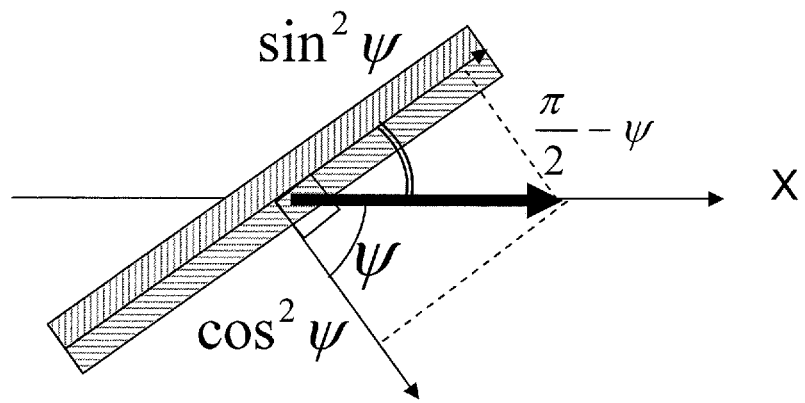
FIG. 14A illustrates a situation where polarized light is incident on a groove at $\psi I=0$ degrees.
Figure 14B:
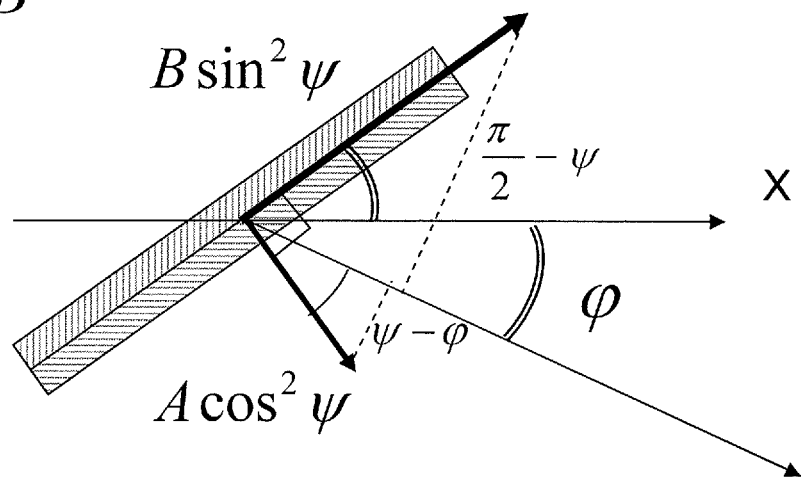
FIG. 14B illustrates a situation where reflected light is produced parallel and perpendicularly to the azimuth angle $\psi$ of the groove in the state shown in FIG. 14A.

FIG. 14A illustrates the energies of incident light to be distributed perpendicularly and horizontally with respect to a groove in a situation where the plane of polarization is supposed to be aligned with the X-axis for the sake of simplicity (i.e., ψI=0). The direction of the groove is specified by the angle ψ. Suppose the incident light is reflected twice in the groove as shown in FIG. 12. In that case, the intensity of plane polarized light, of which the plane of polarization has a certain angle φ, is measured. FIG. 14B shows the angle ψ of the plane polarized light, of which the intensity is measured. If the polarized light intensity at the angle φ is represented by I (ψ, φ), then the intensity can be represented by the following Equation (1) where the energy reflectances in the groove direction (ψ) and the main axis direction (πL/2−ψ) are identified by A and B, respectively:

$$I(\psi,\phi) = A\cos^2\psi\cos^2(\psi-\phi) + B\sin^2\psi\sin^2(\psi-\phi) \quad (1)$$

By modifying Equation (1), this polarized light intensity I (ψ, φ) can be represented by the following Equation (2):

$$I(\psi, \varphi) = \frac{(A+B)}{4} + \frac{(A-B)}{4}\cos 2\psi + \left[\frac{(A+B)}{8} + \frac{(A-B)}{4}\cos 2\psi + \frac{(A+B)}{8}\cos 4\psi\right] \cos 2\varphi + \left[\frac{(A-B)}{4}\sin 2\psi + \frac{(A+B)}{8}\sin 4\psi\right]\sin 2\varphi \quad (2)$$

As can be seen from this Equation (2), the polarized light intensity I (ψ, φ) varies in the period π with respect to φ.

Suppose the incident plane of polarization angle is the general value ψI instead of 0 degrees. In that case, it can be seen, from the foregoing discussion, that the polarized light intensity in a situation where the incident plane of polarization angle is φI and the viewing angle is φ is given by the following Equation (3):

$$I(\psi - \psi_I, \varphi - \psi_I) = \frac{(A+B)}{4} + \frac{(A-B)}{4}\cos 2(\psi - \psi_I) += \left[\frac{(A+B)}{8} + \frac{(A-B)}{4}\cos 2(\psi - \psi_I) + \frac{(A+B)}{8}\cos 4(\psi - \psi_I)\right]\cos 2(\varphi - \psi_I) + \left[\frac{(A-B)}{4}\sin 2(\psi - \psi_I) + \frac{(A+B)}{8}\sin 4(\psi - \psi_I)\right]\sin 2(\varphi - \psi_I) \quad (3)$$

The polarized light intensity given by this Equation (3) is measured at a viewing angle φ in a particular direction. That is why in measuring the average intensity of non-polarized light, the polarized light intensity represented by Equation (3) needs to be integrated for one period with respect to the viewing angle φ. In this case, one period is 180 degrees=π. As a result of this integral operation, the sine and cosine function with respect to φ become equal to zero. That is to say, the light intensity PY (ψI, φ) to be measured in a situation where polarized light with an incident plane of polarization angle ψI is incident on a groove that is specified by an angle ψ and then reflected twice can be represented as a periodic function of 180 degrees with respect to ψI as in the following Equation (4):

$$PY(\psi_I, \psi) = \int_0^\pi I(\psi - \psi_I, \varphi - \psi_I) d\varphi$$
$$= \frac{A+B}{4} + \frac{A-B}{4}\cos 2(\psi - \psi_I) \quad (4)$$

If the light intensity PY (ψI, φ) becomes a cosine function of ψI as represented by this Equation (4), the light intensity PY (ψI, φ) comes to have a maximum value when ψ=ψI. That is why such an angle ψ=ψI at which the light intensity PY (ψI, φ) has a maximum value will be referred to herein as an "intensity maximizing angle YPH". As for the amplitude of variation, considering that the cosine function term varies within the range of +1 through −, the degree of modulation of the intensity variation can be considered. And that ratio will be referred to herein as a "degree of light intensity modulation YD", which can be calculated by the following Equation (5):

$$YD = \frac{MAX - MIN}{MAX + MIN} = \frac{B - A}{A + B} \quad (5)$$

It should be noted that the intensity maximizing angle YPH and the degree of intensity modulation YD are given on a pixel-by-pixel basis. That is why an image, in which the intensity maximizing angle YPH is set for each of the constituent pixels thereof, will be referred to herein as an "intensity maximizing angle image YPH". Likewise, an image, in which the degree of intensity modulation YD is set for each of the constituent pixels thereof, will be referred to herein as a "degree of intensity modulation image YD".

In this case, the intensity maximizing angle YPH and the degree of intensity modulation YD are quantities corresponding to a polarization main axis angle and a degree of polarization, respectively, in normal polarized light measuring. However, their quantitative relation has not been defined clearly yet. Thus, in order to clarify their relation, let us consider what polarization state twice-reflected light will have in a situation where non-polarized light has been incident on a groove.

FIG. 15 illustrates a situation where non-polarized light 1501 has been incident on a groove. If the non-polarized light 1501 has been incident on a groove that has an angle ψ, then its energy would be equally distributed to the main axis direction of the groove and the direction that intersects with the former direction at right angles. That is why energies multiplied by their energy reflectances A and B would be emitted in that groove's main axis direction and the direction that intersects with the main axis direction at right angles, respectively. If the polarized light is measured at an angle φ, the polarized light intensity will have its maximum value (at the reflectance B) in the groove's main axis direction and have its minimum value (at the reflectance A) in that direction that intersects with the main axis direction at right angles as already described with reference to FIG. 12. The degree of polarization DOP is calculated by the following Equation (6):

$$DOP = \frac{MAX - MIN}{MAX + MIN} = \frac{B - A}{A + B} \quad (6)$$

As can be seen from the foregoing discussion, it turned out that the intensity maximizing angle YPH, which is the phase angle of the light intensity variation in a situation where the angle ψI of the plane of polarization of polarized light has been rotated, agrees with the polarization main axis when non-polarized light is radiated. Likewise, it also turned out that the degree of intensity modulation YD, which is the amplitude of the light intensity variation in a situation where the angle ψI of the plane of polarization of polarized light has been rotated, agrees with the degree of polarization DOP when non-polarized light is radiated. Consequently, the Fresnel reflection theory and the surface normal discussion on the supposition that non-polarized light is radiated can be used to analyze a variation in polarized light intensity according to the present invention.

The image processing processor 108 of this embodiment gets the intensity maximizing angle image YPH and the degree of intensity modulation image YD as described above, thereby obtaining information about the object's surface microfacets. Hereinafter, it will be described with reference to FIG. 16 what configuration the image processing processor 108 may have and how the processor 108 may operate.

Figure 16:
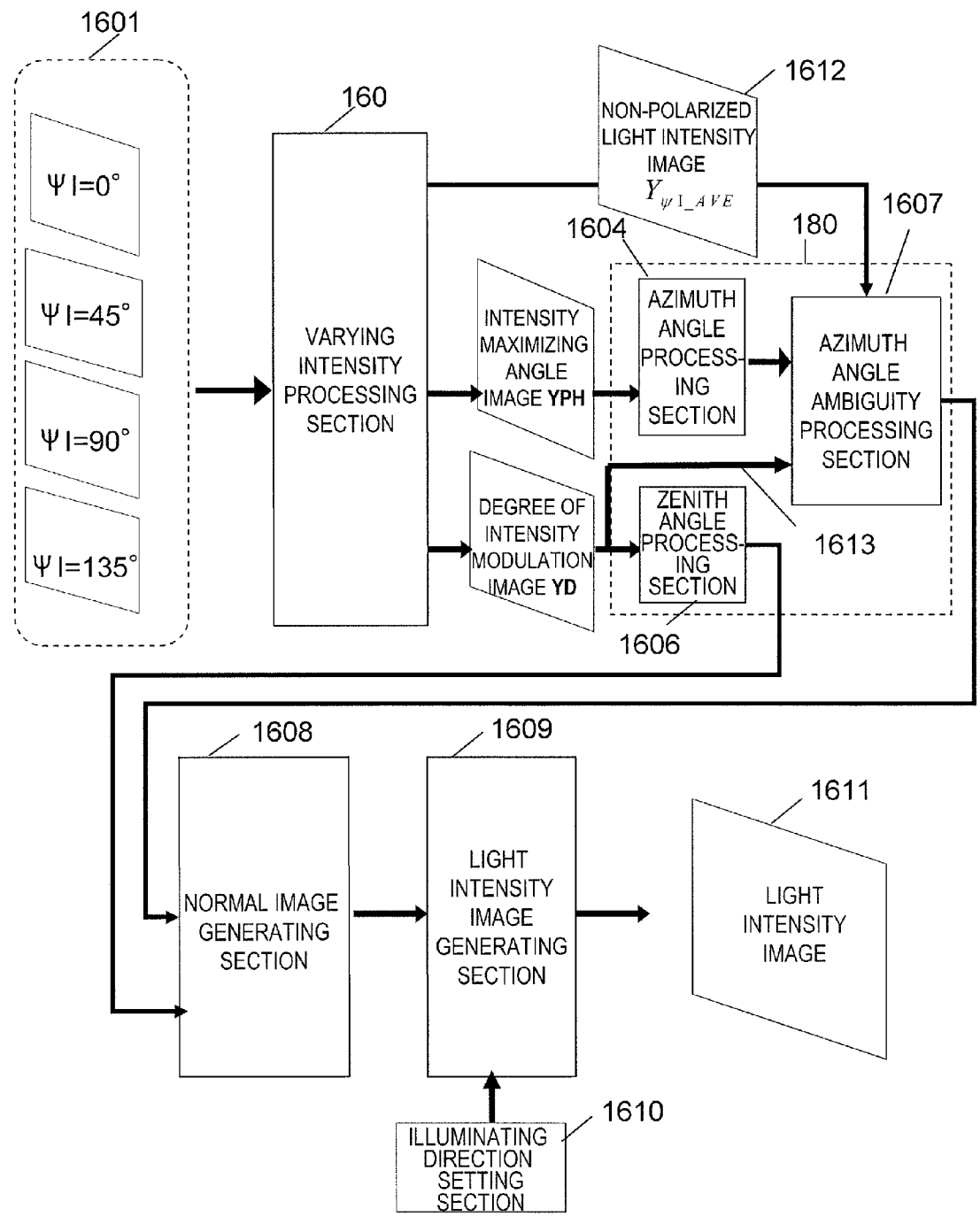
FIG. 16 is a diagram illustrating a configuration for an image processing processor according to the first embodiment of the present disclosure.

FIG. 16 is a block diagram illustrating a configuration for the image processing processor 108. By changing the incident plane of polarization angles ψI of the light from 0 degrees into 45, 90 and 135 degrees and illuminating the object with polarized light at each of these incident plane of polarization angles ψI, a group 1601 of four light intensity images is obtained. Then, the group 1601 of four light intensity images thus captured is input to the varying intensity processing section 160 of this image processing processor 108.

As described above, the intensity variation in a situation where the plane of polarization of polarized light is rotated becomes a cosine function with a period of 180 degrees. The varying intensity processing section 160 fits the intensity variation to the cosine function. Y(ψI) representing the intensity variation can be given by the following Equation (7) using the angle ψI of the plane of polarization of the light as a variable:

$$Y(\psi_1) = Y_{\psi1\_ave} + A_1 \cos(2(\psi_1 - \psi_0)) \quad (7)$$

Figure 17:
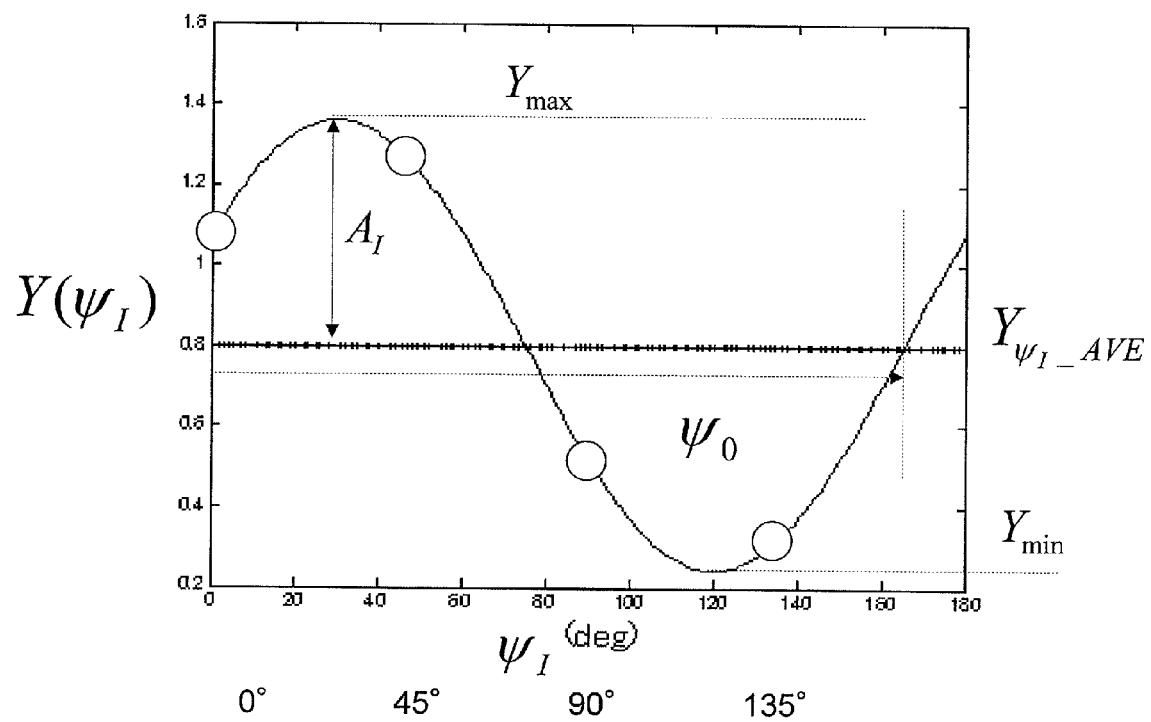
FIG. 17 shows how to fit a cosine function based on samples of the polarized light intensities of four different kinds of polarized light sources.

FIG. 17 shows the cosine function of this intensity variation and indicates the meanings of the amplitude AI, the phase ψo and the average $Y_{\psi I\_ave}$ described above. The four sample points are plotted right on that cosine function for the sake of simplicity.

These values can be estimated by fitting the cosine function based on the four angular samples that have been obtained at regular intervals in the following manner. First of all, the intensity $Y_{\psi I\_ave}$ of the original image under non-polarized light is calculated by the following Equation (8). The right side of this Equation (8) means adding together, and calculating the average of, four light intensity images that have been obtained from an object that is illuminated with polarized light at angles ψI of 0, 45, 90 and 135 degrees, respectively. The intensity $Y_{\psi I\_ave}$ approximately reproduces a light intensity image under non-polarized light and can be used as a normally observed image for an endoscope. That is why the intensity $Y_{\psi I\_ave}$ can be referred to herein as a "non-polarized light average light intensity image".

$$Y_{\psi I\_AVE} = \frac{1}{4}(Y(\psi_I = 0°) + Y(\psi_I = 45°) + Y(\psi_1 = 90°) + Y(\psi_I = 135°)) \quad (8)$$

$$\approx \frac{1}{2}(Y_{max} + Y_{min})$$

Next, optimum fitting from the sampled intensities to the cosine function is carried out using a minimum mean square error. In this case, the optimum fitting process is begun by carrying out sampling in the four directions that are defined by 0, 45, 90 and 135 degrees, respectively. Since the cosine function is determined by the three kinds of information that are amplitude, phase and average, the number of samples for use to determine the cosine function does not have to be four but may actually be any other number as long as the number is at least three. Nevertheless, if samples are taken at a regular interval of 45 degrees in this manner, the optimum fitting can be simplified.

First of all, the square error E of the intensities at the polarization angles of 0, 45 (=π/4), 90 (=π/2) and 135 (=π/4) degrees is defined by the following Equation (9):

$$E = (Y(\psi_I = 0) - I_0)^2 + \left(Y\left(\psi_I = \frac{\pi}{4}\right) - I_1\right)^2 + \quad (9)$$
$$\left(Y\left(\psi_I = \frac{\pi}{2}\right) - I_2\right)^2 + \left(Y\left(\psi_I = \frac{3\pi}{4}\right) - I_3\right)^2 =$$
$$(Y_{\psi I\_AVE} + A_I \cos(2\psi_O) - I_0)^2 + (Y_{\psi I\_AVE} + A_I \sin(2\psi_O) - I_1)^2 +$$
$$(Y_{\psi I\_AVE} - A_I \cos(2\psi_O) - I_2)^2 + (Y_{\psi I\_AVE} - A_I \sin(2\psi_O) - I_3)^2$$

The phase ψo of the cosine function that minimizes this square error can be calculated by the following Equation (10):

$$\frac{\partial E}{\partial \psi_O} = 4A_I[(I_3 - I_1)\cos(2\psi_O) + (I_0 - I_2)\sin(2\psi_O)] = 0 \quad (10)$$

Based on this equation, the solutions can be given by the following Equations (11) and (12):

$$\begin{cases} \psi_O^{(+)} = \frac{1}{2}\cos^{-1}\left(\sqrt{\frac{c^2}{a^2+c^2}}\right) \\ \psi_O^{(-)} = \frac{1}{2}\cos^{-1}\left(-\sqrt{\frac{c^2}{a^2+c^2}}\right) \end{cases} \quad (11)$$

$$\begin{cases} a \equiv (I_3 - I_1) \\ c \equiv (I_0 - I_2) \end{cases} \quad (12)$$

A mathematical function such as an inverse trigonometric function generally imposes the following constraint:

$$0 \le a\cos(x) \le \pi \quad (13)$$

Considering this angular range, by making classification based on the magnitudes of a and c, the respective angles at which the maximum and minimum values are obtained can be calculated by the following Equations (14):

$$\begin{cases} \text{if } a < 0 \text{ and } c > 0, & \psi_{Omin} = \frac{\pi}{2} + \psi_O^{(+)} & \psi_{Omax} = \psi_O^{(+)} \\ \text{if } a < 0 \text{ and } c < 0, & \psi_{Omin} = \frac{\pi}{2} + \psi_O^{(-)} & \psi_{Omax} = \psi_O^{(-)} \\ \text{if } a > 0 \text{ and } c < 0, & \psi_{Omin} = \psi_O^{(+)} & \psi_{Omax} = \frac{\pi}{2} + \psi_O^{(+)} \\ \text{if } a > 0 \text{ and } c > 0, & \psi_{Omin} = \psi_O^{(-)} & \psi_{Omax} = \frac{\pi}{2} + \psi_O^{(-)} \end{cases} \quad (14)$$

The ψ0max value at which the maximum value is obtained can be used as it is as the intensity maximizing angle image YPH:

$$YPH = \psi_{Omax} \quad (15)$$

Next, the maximum and minimum values of the amplitude are obtained. First of all, to obtain the amplitude $A_I$, the square error is minimized by the following Equations (16) and (17):

$$\frac{\partial E}{\partial A_I} = 0 \quad (16)$$

$$A_I = \frac{1}{2}[(I_0 - I_2)\cos(2\psi_O) - (I_3 - I_1)\sin(2\psi_O)] \quad (17)$$

Using the amplitude $A_I$, the maximum and minimum values of the amplitude are calculated by the following Equations (18):

$$Y_{max} = Y_{\psi I\_AVE} + A_I$$

$$Y_{min} = Y_{\psi I\_AVE} - A_I \quad (18)$$

Thus, if the maximum and minimum values Ymax and Ymin of the amplitude given by these Equations (18) are applied as MAX and MIN to Equation (5), the degree of intensity modulation image YD can be obtained.

Normal optimum fitting to a cosine function can be carried out on three or more samples and its method is disclosed in Patent Document No. 5, for example.

By performing these processing steps, the intensity maximizing angle image YPH and the degree of intensity modulation image YD can be obtained. In FIG. 16, the intensity maximizing angle image YPH and the degree of intensity modulation image YD are identified by the reference signs YPH and YPH, respectively. As shown in FIG. 16, the intensity maximizing angle image YPH and the degree of intensity modulation image YD are passed to an azimuth angle processing section 1604 and a zenith angle processing section 1606, respectively.

Figure 18A:
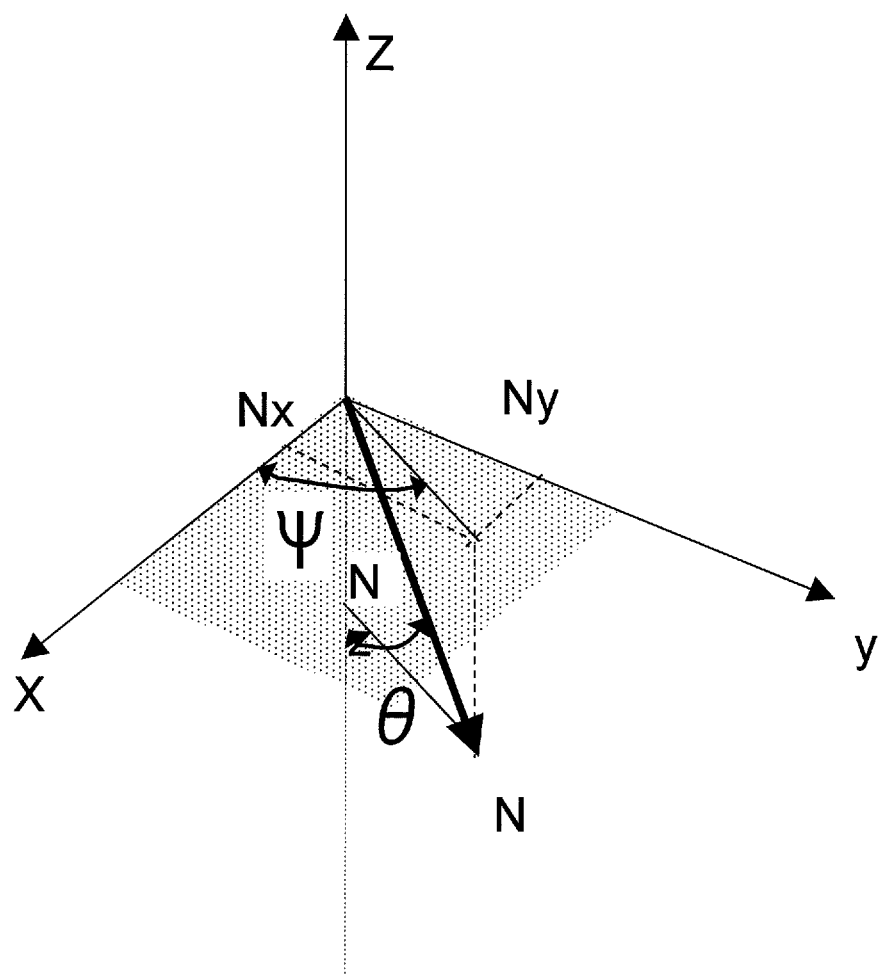
FIG. 18A shows a relation between the XYZ components of a surface normal, the azimuth angle $\psi$ and the zenith angle $\theta$.

FIG. 18A shows the azimuth angle and zenith angle that are two angles that determine the direction of a normal to the object's surface. The normal vector is a three-dimensional vector but its length has been normalized to one. Thus, the normal vector has a degree of freedom of two. And when represented as an angle, the normal vector can be represented by the azimuth angle ψ within the screen and the zenith angle θ with respect to the line of sight. In a normal right-handed system, X and Y axes are defined within the image and the direction indicated by the Z-axis becomes the line of sight (i.e., optical axis) direction. The relation between the normal and three components (Nx, Ny, Nz) is as shown in FIG. 18A. Once the azimuth angle ψ and the zenith angle θ have been obtained, the surface normal at that point is represented by the following Equations (19):

$$N_X = \cos\psi \sin\theta$$

$$N_Y = \sin\psi \sin\theta$$

$$N_Z = \cos\theta \quad (19)$$

The azimuth angle processing section 1604 calculates the azimuth angle ψ using the intensity maximizing angle image YPH. In this case, based on the conclusion of the foregoing discussion, the Fresnel theory about specular reflection in a situation where non-polarized light has been incident is used as a reference. According to that theory, as disclosed in Non-Patent Document No. 2, non-polarized light is incident and is subjected to polarimetry by a polarizer that is arranged in front of the camera. In that case, in the reflected light that has been specular-reflected from the object's surface, the P-wave attenuates and the S-wave prevails instead. As a result, the azimuth angle ψ of a normal to the surface of the groove becomes equal to the angle of the plane of polarization that minimizes the intensity. The direction defined by this azimuth angle ψ agrees with the direction that intersects at right angles with that the plane of polarization that maximizes the intensity. And if this relation is applied to the polarized illumination of the present invention, the azimuth angle ψ of a normal to the surface of the groove agrees with the direction that intersects at right angles with the direction that maximizes the polarized light intensity. That is to say, the azimuth angle ψ can be determined by the intensity maximizing angle image YPH.

In this case, the problem is that this azimuth angle ψ has an ambiguity of 180 degrees as mentioned as "180° ambiguity" in Non-Patent Document No. 2. That is to say, two angles that are different from each other by 180 degrees are obtained as candidates for the azimuth angle ψ of a normal to the groove's surface. To choose one of those two candidates will be referred to herein as "ambiguity processing".

To perform the ambiguity processing, the azimuth angle ambiguity processing section 1607 shown in FIG. 16 uses either a non-polarized light intensity image 1612 or the degree of intensity modulation image YD.

Figure 19A:
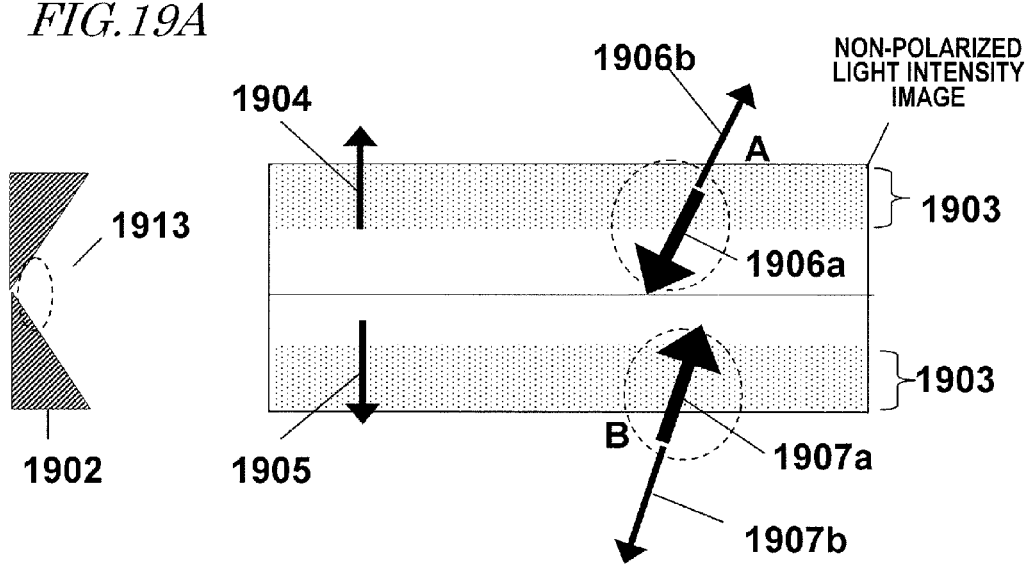
FIG. 19A illustrates a situation where an intensity gradient vector is used to solve a 180 degree ambiguity of the azimuth angle of a normal.
Figure 19B:
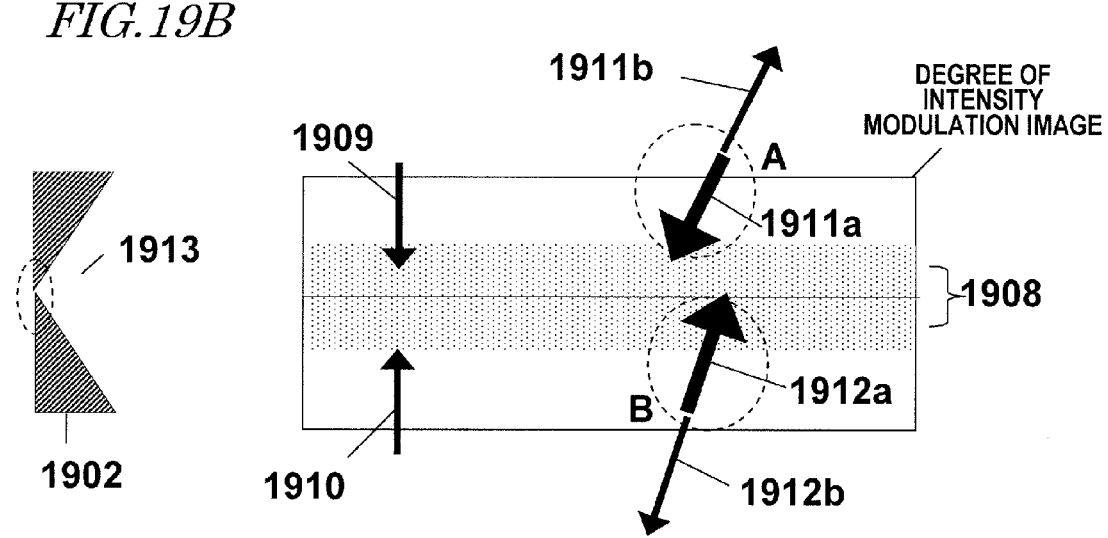
FIG. 19B illustrates a situation where a degree of intensity modulation gradient vector is used to solve the 180 degree ambiguity of the azimuth angle of a normal.

Next, it will be described with reference to FIGS. 19A and 19B specifically what processing is carried out by the azimuth angle ambiguity processing section 1607. FIG. 19A illustrates a light intensity image and a cross section 1902 of a groove. Since the groove has a bigger size than each pixel, there is an intensity distribution within the single groove. It should be noted that the cross section 1902 of the groove has two tilted surfaces, which may have a tilt angle of 30 to 60 degrees.

When the groove is irradiated with illuminating light that has come from almost right over the groove, the light intensity image comes to have an increased intensity value (i.e., gets brighter) in the shadowed areas 1903 and a decreased intensity value (i.e., gets darker) in the area 1913 near the bottom of the groove, respectively. That is to say, the intensity values come to have a gradient inside the groove. If the gradient vectors of the intensity values are calculated by subjecting the intensity $Y_{\psi I\_ave}$ that has been obtained under non-polarized light to spatial differentiation processing, intensity gradient vectors 1904 and 1905 can be obtained. These gradient vectors 1904 and 1905 are calculated respectively for the two tilted surfaces in the groove.

On the other hand, since the azimuth angle ψ obtained in the intensity maximizing angle image YPH has an ambiguity of 180 degrees, two candidates 1906a and 1906b are obtained at a point A and two more candidates 1907a and 1907b are obtained at a point B. In FIG. 19A, these candidate vectors are illustrated as having slightly shifted from the right direction of the groove. However, this is just a schematic representation that is simplified to make the angular difference to be described below more easily understandable and is never an essential one.

And if one of the two candidate azimuth angles ψ that has the greater angular difference with respect to the intensity gradient vector is adopted, then the candidates 1906a and 1907a will be adopted at the points A and B, respectively. Consequently, the azimuth angle ψ of the candidate 1906a that is indicated by the downward arrow is chosen at the point A and the azimuth angle ψ of the candidate 1907a that is indicated by the upward arrow is chosen at the point B correctly.

Next, it will be described with reference to FIG. 19B how to choose one of the two candidates based on the degree of intensity modulation image YD.

If the groove is irradiated with illuminating light that has come from almost right over the groove, then the light will be reflected twice inside the groove, and therefore, the degree of polarization DOP becomes high around the bottom of the groove. As can be seen from the theory described above, even if the polarized light source is rotated, the degree of intensity modulation value will also behave in a similar manner. That is why the degree of intensity modulation image YD comes to have an increased degree of intensity modulation value in the area 1908 near the bottom 1913 of the groove but a decreased value outside of the groove, respectively. If the gradient vectors of the degree of intensity modulation image YD are calculated, degree of intensity modulation gradient vectors 1909 and 1910 can be obtained. On the other hand, since the azimuth angle ψ obtained in the intensity maximizing angle image YPH has an ambiguity of 180 degrees, two candidates 1911a and 1911b are obtained at a point A and two more candidates 1912a and 1912b are obtained at a point B. And if one of the two candidate azimuth angles ψ that has the smaller angular difference is adopted by using the estimated value of the angular difference between the gradient vector of the degree of intensity modulation and the intensity maximizing angle, then the candidates 1911a and 1912a will be adopted at the points A and B, respectively. In FIGS. 19A and 19B, the gradient vectors and the normal vectors are illustrated as if those vectors were calculated at mutually different points. However, this illustration is adopted just for convenience sake. In actual image processing, the gradient vectors are calculated right at the points A and B where the normal vectors are estimated.

The foregoing description could read as stating that the normal vectors can be obtained correctly even by using either the intensity gradient vector or the degree of intensity modulation vector by itself. However, that is a simple misunderstanding. Actually, those pieces of information may include a lot of noise due to spatial differentiation and are totally unreliable by themselves. It should be noted that those pieces of information cannot be useful unless they are combined with the intensity maximizing angle image obtained by using the polarized light source of the present invention.

FIG. 19C is a flowchart showing the procedure of determining the azimuth angle.

First, in Step S19C01, a candidate ψ1 for the azimuth angle ψ of the groove is obtained by rotating the (intensity maximizing angle) value of the intensity maximizing angle image YPH 90 degrees. Next, in Step S19C02, another azimuth angle candidate ψ2 is obtained by rotating the former candidate ψ1 180 degrees. Then, in Step S19C03, the estimated values Δ1 and Δ2 of the angular differences between the gradient angle (gradangle) that has been obtained based on either the intensity gradient or the degree of intensity modulation and the candidates ψ1 and ψ2 are calculated:

Δ1=min(|ψ1−gradangle|, 360−"ψ1−gradangle|)

Δ2=min(|ψ2−gradangle|, 360−|ψ2−gradangle|)    (20)

As to whether the intensity gradient or the degree of intensity modulation may be adopted, it may be determined by the property of the object's surface microfacets. Actually, however, a simple situation where the intensity variation literally represents the surface normal rarely happens if ever. In reality, the intensity will change in various manners due to not just the normal but also interreflection and other engineering effects. In comparison, the degree of intensity modulation image can be obtained not just with good stability but also even without making any special modification to the image sensor on the sensing end if the polarized light source is improved just as disclosed in the foregoing description of the present invention. Consequently, the degree of intensity modulation image is much more effective.

Next, in Step S19C04, a decision is made as to whether the intensity gradient or the degree of intensity modulation gradient is used. If the former is chosen, the condition of Step S19C05 is set to choose one of ψ1 and ψ2 that has the greater angular difference, thereby determining ψ. On the other hand, if the latter is chosen, then the condition of Step S19C06 is set to choose one of ψ1 and ψ2 that has the smaller angular difference, thereby determining ψ.

The zenith angle processing section 1606 calculates the zenith angle θ using the degree of intensity modulation image YD. In the prior art, as of now, nobody has ever accurately and theoretically clarified the relation between the degree of polarization and the zenith angle θ in a situation where the light is reflected twice by a surface groove. According to this embodiment, the Fresnel theory for a situation where non-polarized light is incident is adopted. In that case, as disclosed in Non-Patent Document No. 2, non-polarized light is incident and subjected to polarimetry by a polarizer that is arranged in front of a camera. If the degree of polarization DOP of the light that has been specular reflected from the object's surface is calculated at this point in time, the Fresnel theory of curves that uses a refractive index NN is satisfied between the zenith angle of the surface normal and DOP. And if that theory is applied to the polarized light source of the present invention, the zenith angle can be determined by using the value of the degree of intensity modulation image YD instead of DOP. Nevertheless, as also described in Non-Patent Documents Nos. 2 and 3, this zenith angle has ambiguity that interposes a Brewster angle.

Figure 20A:
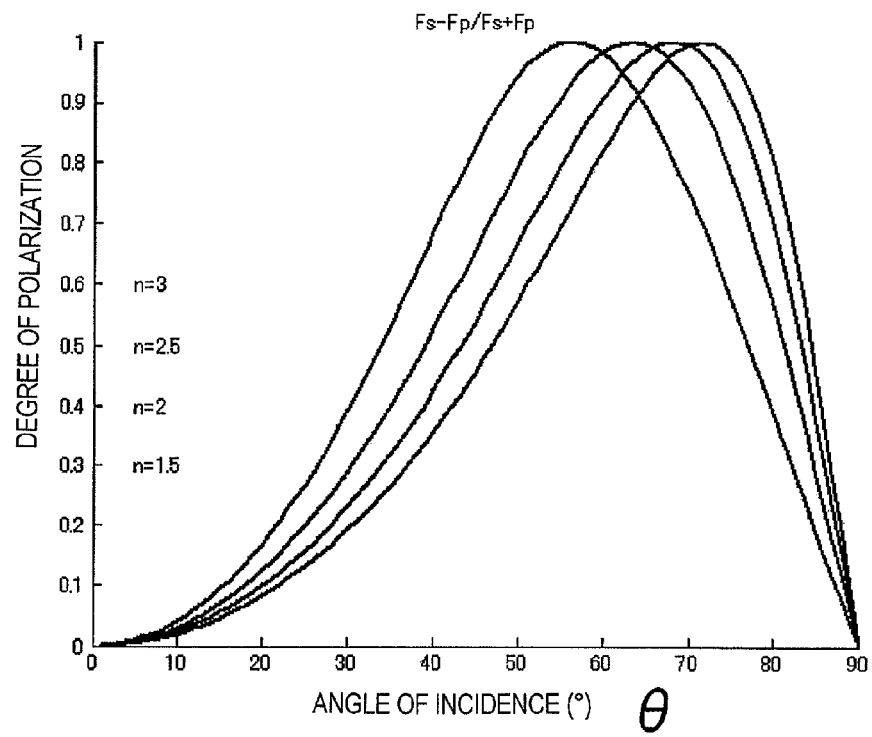
FIG. 20A is a graph plotting theoretical values that show relations between the angle of incidence $\theta$ and the degree of polarization produced by Fresnel reflection.

That ambiguity will be described. FIG. 20A shows how the degree of polarization DOP changes with the angle of incidence of the illumination with the refractive index NN changed from 1.5 through 3.0. The angle of incidence becomes the zenith angle at the surface as it is. If the refractive index is increased, the peak position shifts from around 55 degrees to around 70 degrees in the direction in which the angle increases. If non-polarized light is incident on the object's surface at an angle of incidence θ and then specular reflected from the surface at the same angle of emittance θ, then the degree of polarization DOP can be calculated by the following Fresnel reflection equations using the refractive index NN of the material:

$$DOP = \frac{FF_S - FF_P}{FF_S + FF_P} \tag{21}$$

$$FF_S = \left( \frac{\cos\theta - \sqrt{(NN)^2 - \sin^2\theta}}{\cos\theta + \sqrt{(NN)^2 - \sin^2\theta}} \right)^2$$

$$FF_P = \left( \frac{-(NN)^2\cos\theta + \sqrt{(NN)^2 - \sin^2\theta}}{(NN)^2\cos\theta + \sqrt{(NN)^2 - \sin^2\theta}} \right)^2$$

The "ambiguity" means that when the zenith angle is calculated based on DOP, two angles will be estimated to interpose the Brewster angle, at which a curve reaches its peak, between them and none of them can be chosen unambiguously.

Figure 20B:
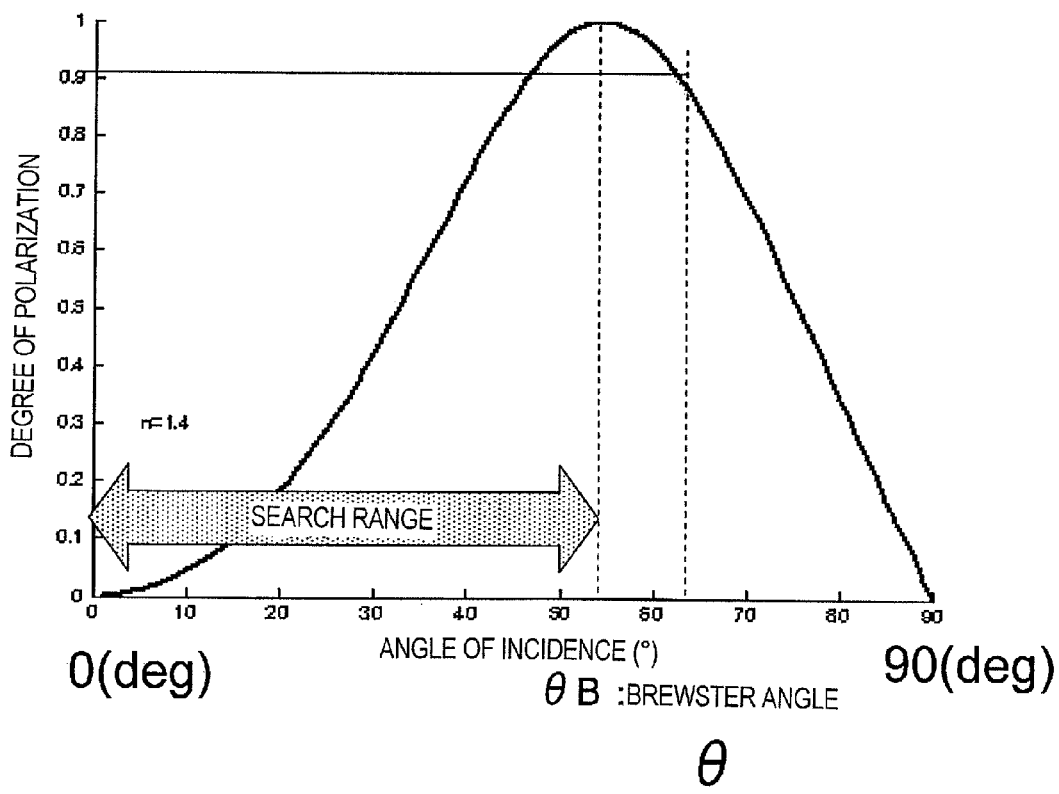
FIG. 20B indicates the search range of a zenith angle $\theta$.

FIG. 20B shows how that ambiguity interposing the Brewster angle can be solved. The groove at an organism's surface mucosa to be observed with an endoscope is supposed to have a tilt angle that is equal to or smaller than 55 degrees, which substantially corresponds to the Brewster angle. And by defining the search range from 0 degrees through the Brewster angle as shown in FIG. 20B, the difficulty is overcome.

Figure 20C:
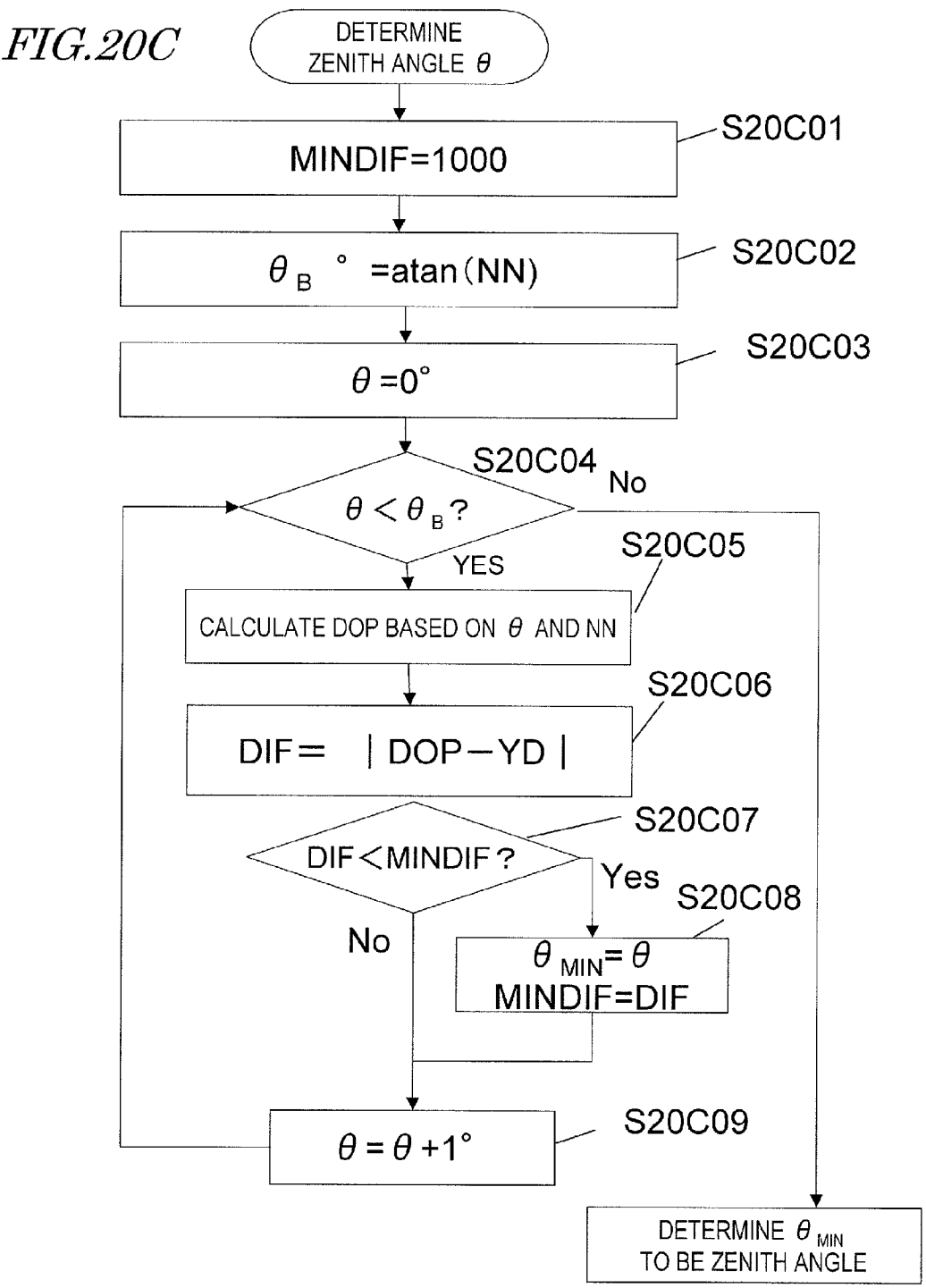
FIG. 20C is a flowchart showing how to determine the zenith angle $\theta$.

FIG. 20C is a flowchart showing how to determine the zenith angle.

First, in Step S20C01, the maximum value MINDIF of the difference in degree of polarization is set. Next, in Step S20C02, the Brewster angle $θ_B$ is obtained theoretically based on the refractive index NN. Then, θ is set in Step S20C03 to be zero degrees. And if it turns out in the next processing step S20C04 that θ is smaller than the Brewster angle, calculations are made in the processing steps that follow. Specifically, first, in Step S20C05, the theoretical degree of polarization DOP given by Equation (21) is obtained. Next, in Step S20C06, the absolute value of the difference DIF between that DOP value and the degree of intensity modulation YD is calculated. If DIF turns out to be smaller than MINDIF in the next processing step S20C07, θ is set to be $θ_{MIN}$ and DIF is set to be MINDIF. After that, in Step S20C09, that θ angle is increased by one degree at a time to continue the same loop processing. And if that loop processing comes to an end in Step S20C04, then $θ_{MIN}$ is determined to be the zenith angle.

The normal image generating section 1608 obtains a normal vector (Nx, Ny, Nz) with respect to an object's surface in the camera coordinate system by Equation (19) using the azimuth angle φ and zenith angle θ thus obtained, and defines that normal vector as representing a two-dimensional normal image.

The light intensity image generating section 1609 generates a light intensity image based on a physical reflection modeling formula by giving the camera viewpoint direction and the illuminating light source direction to the normal image thus obtained. In this example, the Cook-Torrance model is used as a modeling formula that represents the object's specular reflection well. According to the Cook-Torrance model, the intensity Is can be represented by the following Equation (22):

$$I_S = K \frac{FG \frac{1}{4m^2\cos^4\alpha} \exp\left(-\frac{\tan^2\alpha}{m^2}\right)}{\cos\theta_r} \quad (22)$$

Figure 18B:
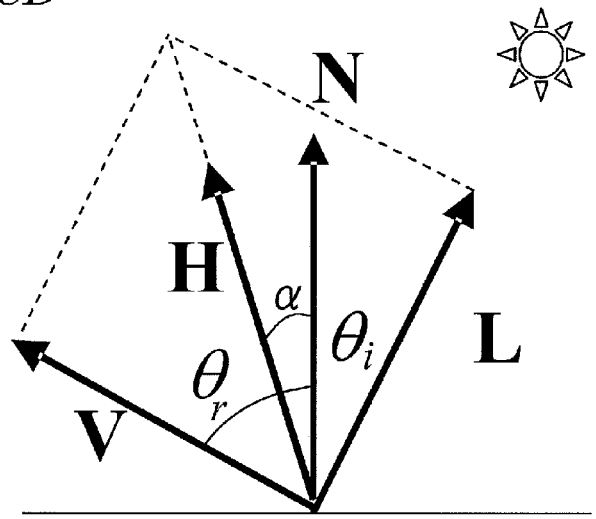
FIG. 18B shows a relation between a surface normal N, a light source vector L, a viewpoint vector V and a bisector vector H.

FIG. 18B shows a relation between the vector and the angle in a situation where the Cook-Torrance model is used and illustrates a surface normal N, a light source vector L and a viewpoint vector V. If a bisector vector H of the light source vector L and the viewpoint vector V is used, α in the Equation (22) is the angle defined by the bisector vector H with respect to the normal N and θr is the angle formed between the viewpoint vector V and the normal N. The Fresnel coefficient F and the geometric attenuation factor G are represented by the following Equations (23) and (24), respectively:

$$F = \frac{1}{2}\frac{(g-c)^2}{(g+c)^2}\left(1 + \frac{[c(g+c)-1]^2}{[c(g-c)+1]^2}\right) \quad (23)$$

$$G = \min\left\{1, \frac{2(N \cdot H)(N \cdot V)}{(V \cdot H)}, \frac{2(N \cdot H)(N \cdot L)}{(V \cdot H)}\right\} \quad (24)$$

Also, the coefficient K is a coefficient concerning the illuminance of the incoming light. If this Cook-Torrance model is used, the light intensity image can be generated based on the surface normal image. For that purpose, however, not only the refractive index NN but also the viewpoint vector V, the light source vector L and other geometric settings need to be determined as well.

The illuminating direction setting section 1610 is a component that determines this light source vector, which may be set arbitrarily by a doctor, who is an observing user when making an endoscope diagnosis.

By performing these processing steps, surface microfacets are estimated based on a two-dimensional image, thereby generating a light intensity image 1611 in which the surface microfacets are reflected as a surface normal image on the light intensity. Since this is an image that is based on the estimated normal image, the illumination can be changed freely on the computer. As a result, it is possible to overcome one of the problems with an endoscope that it is difficult to observe surface microfacets because the position of the light source cannot be changed.

It should be noted that each of the components shown in FIG. 16 could be implemented as either a piece of special-purpose hardware or a combination of hardware and software. In this embodiment, the functions of at least some of the components described above may be performed by a processor. Also, the operation of the image processing section of this embodiment can be defined by a computer program that is stored in a memory in the image processing section. Such a computer program is a set of instructions that make the processor provided for the image processing apparatus perform the various processing steps (shown in FIGS. 19C and 20C).

Portion (a) of FIG. 21 illustrates a result of a surface normal estimation experiment according to this embodiment. The object is a lenticular lens plate with a semicylindrical cross section. To make specular reflection prevail, the object is painted in either a red-based color or a chocolate-based color. The processing described above was carried out on such an object.

In portion (a) of FIG. 21, the upper image is the non-polarized light intensity image 1612 shown in FIG. 16 and the lower image is the degree of intensity modulation image YD shown in FIG. 16. In the non-polarized light intensity image, white (i.e., bright) pixels have high intensities. On the other hand, in the degree of intensity modulation image, dark (i.e., low-lightness) pixels have high values (degrees of modulation). Portion (b) of FIG. 21 schematically illustrates only the small rectangular portion shown in portion (a) of FIG. 21. The light intensity image has an iterative pattern in which high-intensity portions (i.e., white portions 2104) corresponding to convex portions 2101 alternate with low-intensity portions (i.e., shadowed portions 2103) corresponding to concave portions 2102. On the other hand, the degree of intensity modulation image has an iterative pattern in which high-degree-of-modulation portions (i.e., hatched portions 2105) alternate with low-degree-of-modulation portions (i.e., white portions 2106). And the low-intensity portions correspond to high degrees of intensity modulation.

FIG. 22 is a cross-sectional view of the object (i.e., the lenticular plate) shown in FIG. 21. The lenticular plate has a periodic concavo-convex pattern. The illuminating light is reflected only once from the convex portion 2201 and imaged by a camera. On the other hand, the light that produces an image of the concave portion 2201 is reflected once to have a very high intensity. Since the concave portion 2202 forms a groove, the light is eventually reflected twice and then imaged by the camera. As a result, the image produced by the light that has been reflected from the concave portion 2202 has a relatively low intensity.

Figure 23:
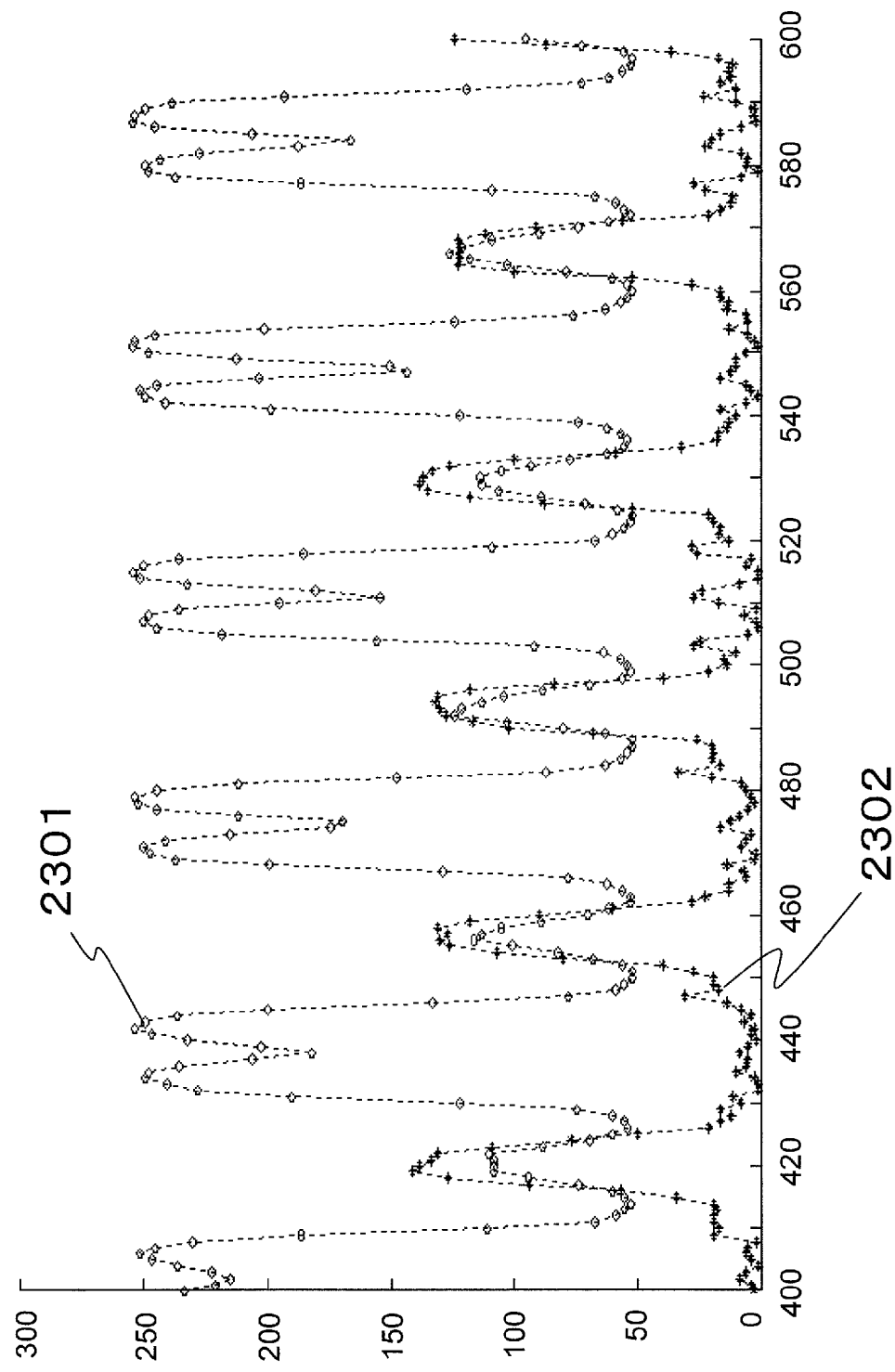
FIG. 23 shows the result of an experiment on the light intensity and degree of intensity modulation YD of a lenticular lens plate.

FIG. 23 shows the profiles of the light intensity and degree of intensity modulation shown in FIG. 21. In FIG. 23, the curve 2301 represents the light intensity and the curve 2302 represents the degree of intensity modulation. It can be seen that in a low-intensity portion (i.e., a valley of the curve 2301), the degree of intensity modulation increases.

Figure 24A:
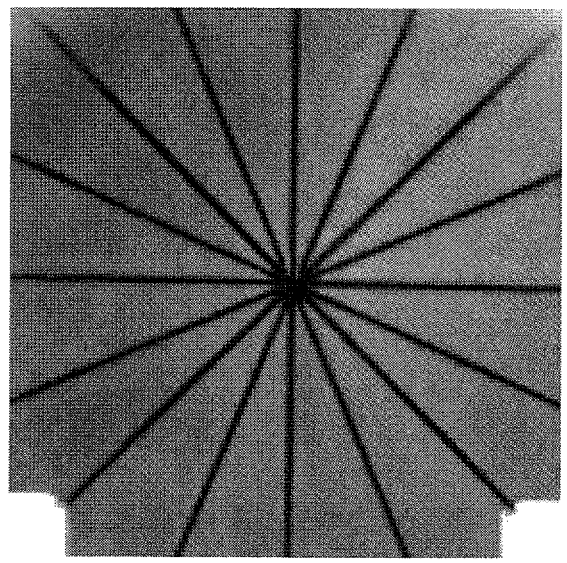
FIG. 24A illustrates, as an example, a stellar object with grooves.
Figure 24B:
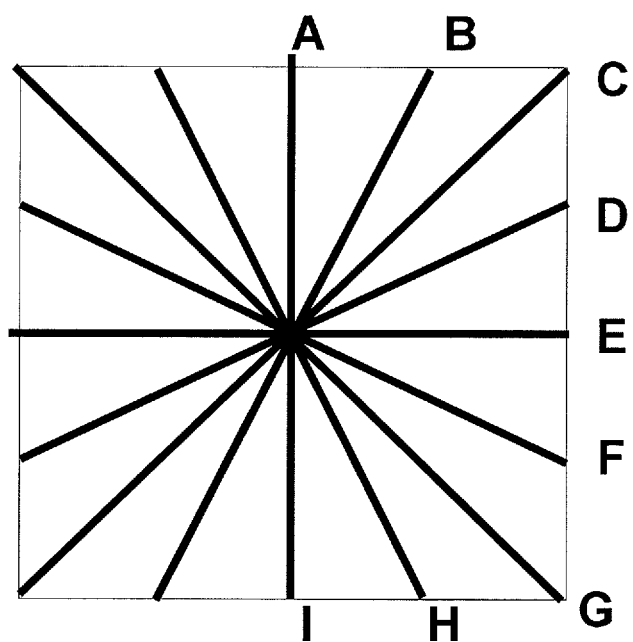
FIG. 24B schematically illustrates the object shown in FIG. 24A.

FIG. 24 shows plan views of another object. This object is a plastic plate through which eight grooves A through I were cut and which was painted. Specifically, FIG. 24A is a photograph showing a light intensity image that was obtained by shooting the real object and FIG. 24B is a schematic representation thereof. Two adjacent grooves within this plane had an azimuth angle interval of 22.5 degrees.

Figure 25:
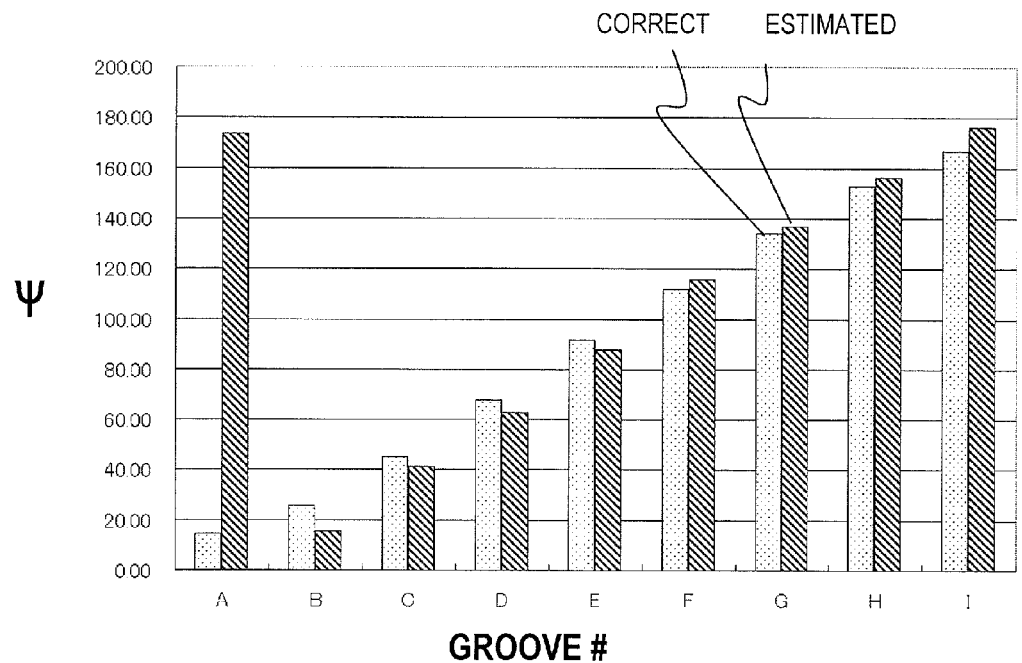
FIG. 25 shows results of estimation of the azimuth angles $\psi$ of normal vectors with respect to those grooves of the stellar object.
Figure 26:
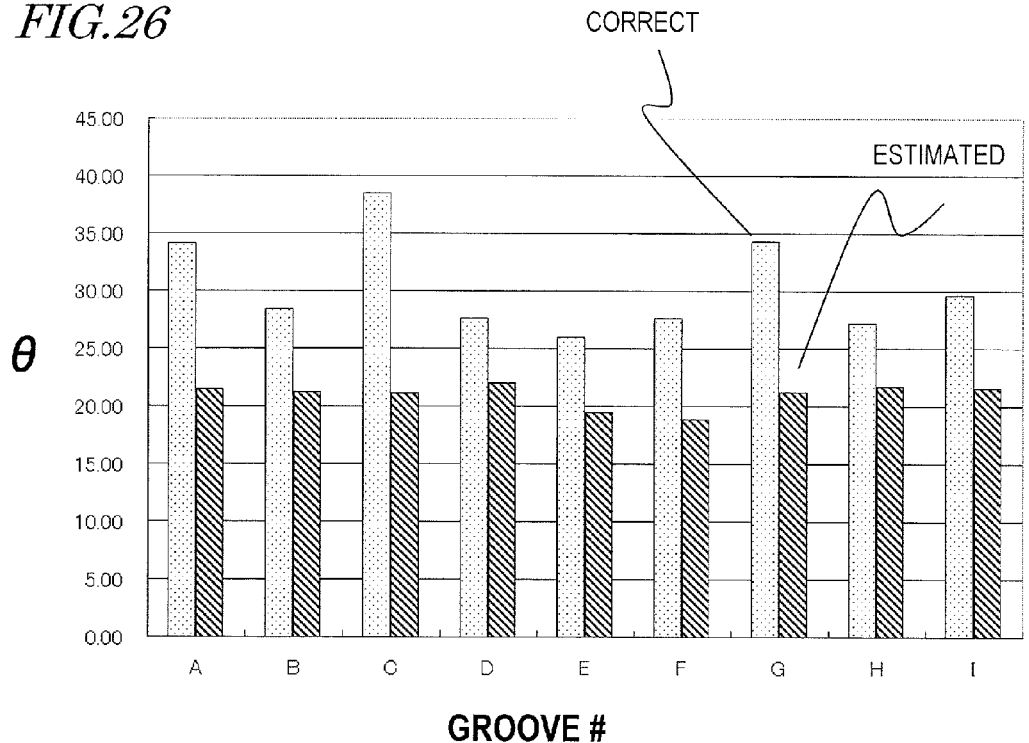
FIG. 26 shows results of estimation of the zenith angles $\theta$ of normal vectors with respect to those grooves of the stellar object.

FIGS. 25 and 26 respectively show the azimuth angles ψ that were estimated by the azimuth angle ambiguity processing section 1607 shown in FIG. 16, and the zenith angles θ that were estimated by the zenith angle processing section 1606 shown in FIG. 16, with respect to the respective grooves A through I of the object shown in FIG. 24. The hatched graphs show the correct angles and the shadows graphs show the estimated ones. The correct angles were measured with a laser displacement meter.

As can be seen from the results shown in FIG. 25, the azimuth angles could be estimated with an error of approximately 10 degrees. On the other hand, as can be seen from FIG. 26, the zenith angles estimated had more significant errors.

Figure 27A:
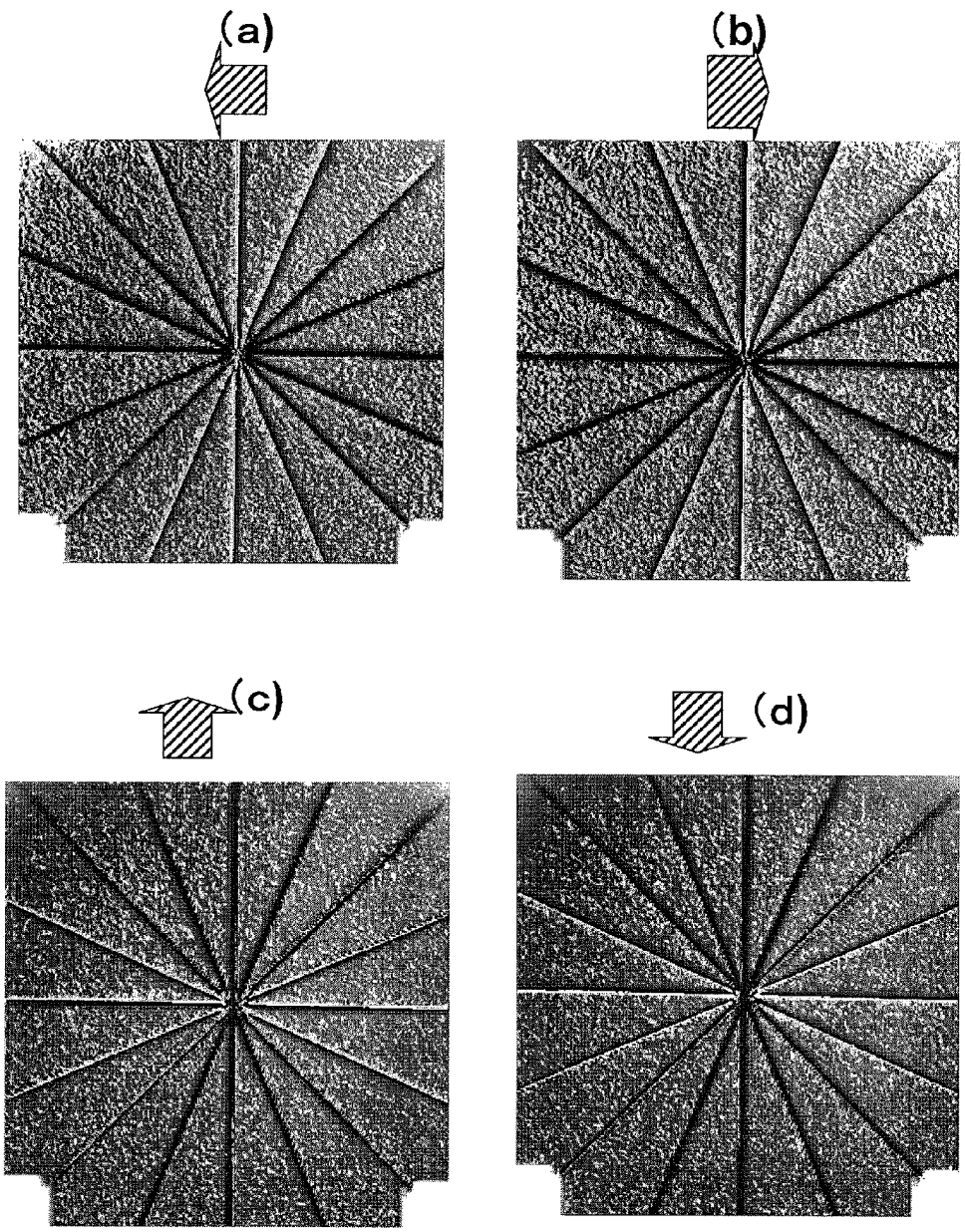
FIG. 27A shows results of experiments in which images were generated by illuminating the normal images of the stellar object in four different directions.
Figure 27B:
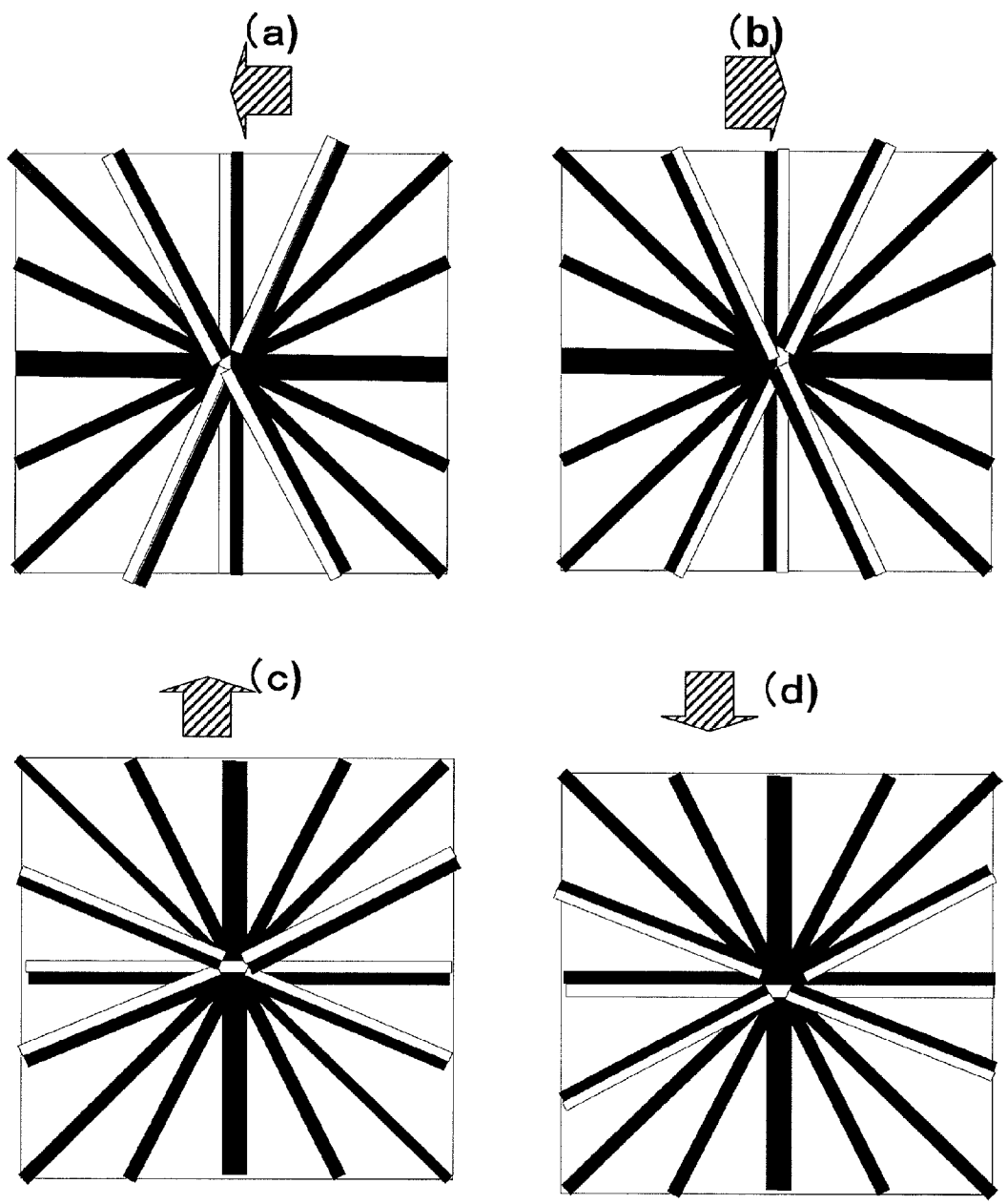
FIG. 27B schematically illustrates the images shown in FIG. 27A.

FIG. 27 shows light intensity images that were obtained by performing every processing shown in FIG. 16 on the object shown in FIG. 24. Specifically, portions (a), (b), (c) and (d) of FIG. 27A show the images that were generated by illuminating the object with the light source that was located on the right-hand side of the screen, on the left-hand side of the screen, under the screen, and over the screen, respectively. FIG. 27B illustrates schematic representations thereof and its portions (a) through (d) exactly correspond to those portions (a) through (d) of FIG. 27A. It can be seen that the grooves identified by A through I could be represented clearly by changing the illuminating direction. Consequently, a definitely embossed image can be provided for the endoscope image that is illuminated with only the light source located right in front of the object as shown in FIG. 24A.

Embodiment 2

Figure 28:
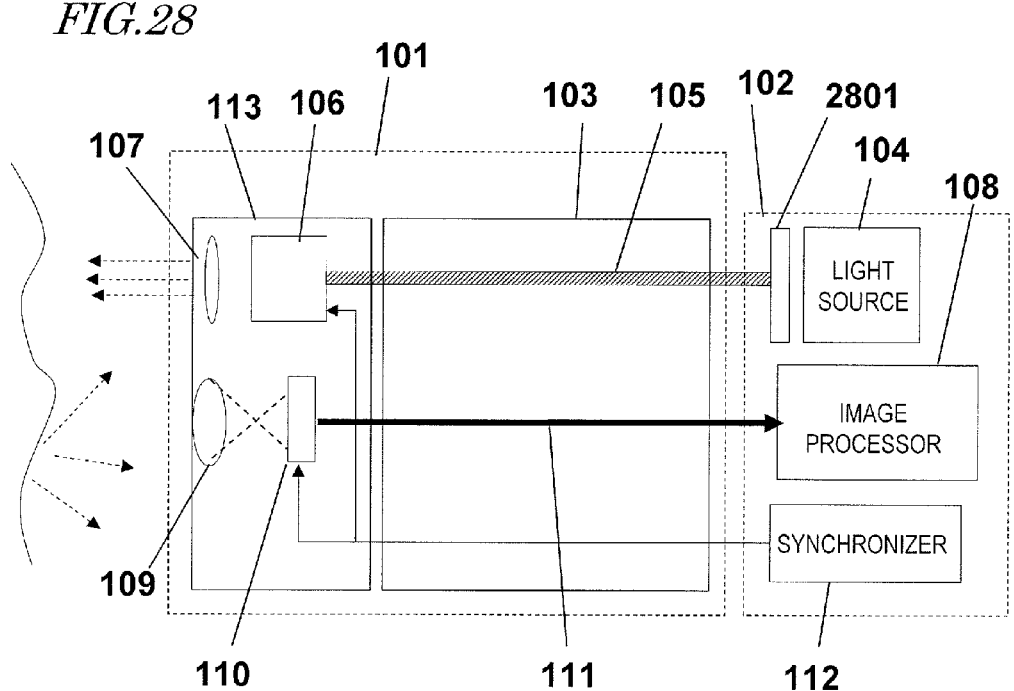
FIG. 28 illustrates a configuration for an image processing apparatus according to a second embodiment of the present disclosure.

Next, a second embodiment of an image processing apparatus according to the present invention will be described with reference to FIG. 28.

The image processing apparatus of this embodiment has almost the same configuration as its counterpart shown in FIG. 1C but has an additional color filter 2801, which is the only difference from the apparatus shown in FIG. 1C.

The present inventors discovered and confirmed via experiments that the polarization state observed at a groove changes significantly with the color of the object. Specifically, when shot within a narrow range of around a wavelength of 520 nm, the image of a chocolate or red object becomes generally dark, and very intense polarization can be observed at the groove. On the other hand, when the object has a yellow-based color, the image shot is bright as a whole but polarization at the groove becomes very weak. This is probably because when the object has a bright color, diffuse reflection components will prevail and make the specular reflection in two stages almost insensible. According to this embodiment, in order to observe intense polarization, a polarized light source, of which the wavelength falls within a range where the spectral reflectance of the object is low, is used. For example, if the object is yellow, then a dark image is shot using a blue-based (i.e., the complementary color of the color yellow) light source color. The wavelength range of the illuminating light can be determined with the spectral reflectance of the object taken into account.

Figure 29:
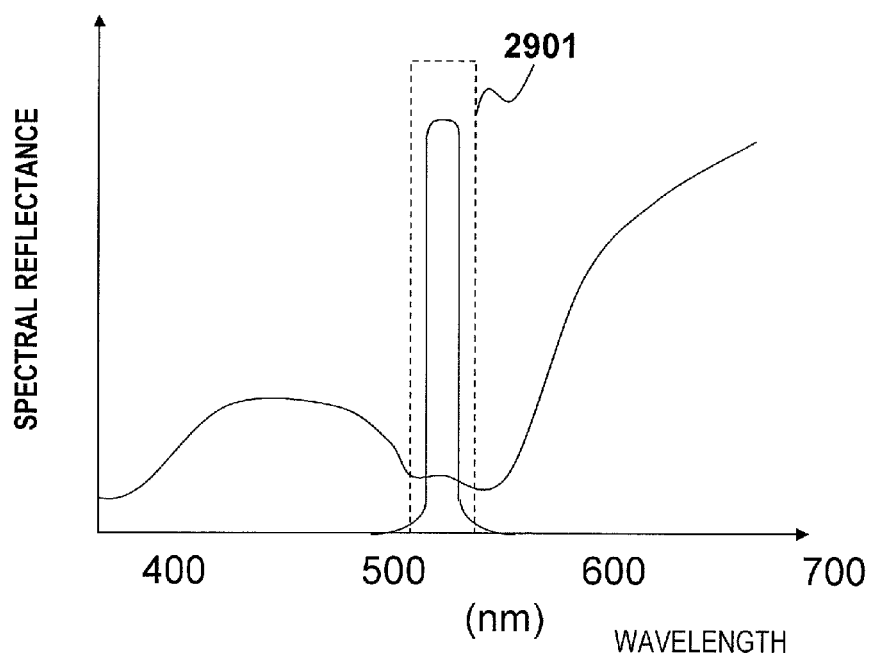
FIG. 29 shows the optimized characteristic of a spectral filter.

FIG. 29 shows an exemplary spectral reflectance of the mucosa of a large intestine, which is a typical organ to be observed with an endoscope. The large intestine mucosa has an outstanding peak of absorption in the wavelength range of 520 to 600 nm. That is why if the characteristic of the spectral filter is matched to that low-reflectance range as indicated by the reference numeral 2801, then the object will be shot in a relatively dark color in that wavelength range. Consequently, the surface groove can be observed effectively with polarization as described above according to the present invention. Also, for that purpose, the filter 2801 is arranged at the output stage of the light source 104. Optionally, the filter 2801 may be used selectively only when a normal color image is not going to be shot. Also, the color filter could be arranged right before the image sensor 110.

Embodiment 3

Hereinafter, a third embodiment of an image processing apparatus according to the present invention will be described with reference to FIGS. 30A and 30B. The image processing apparatus of this embodiment is applicable to not only an endoscope but also a camera with illumination for medical purposes (which may be used in a dermatologist's or a dentist's), a fingerprint scanner, an optical surface analyzer and other devices.

Figure 30A:
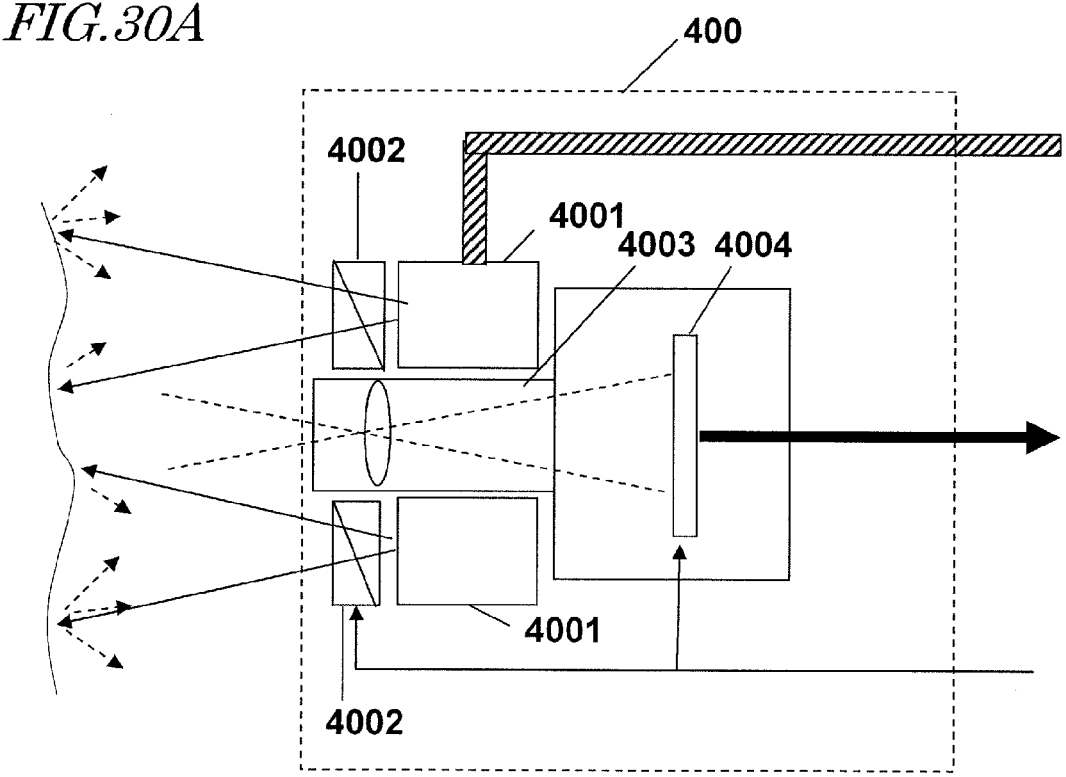
FIG. 30A illustrates a configuration according to a third embodiment of the present disclosure.

FIG. 30A illustrates an exemplary configuration according to this embodiment. The image processing apparatus of this embodiment uses a device 400 instead of the endoscope 101 shown in FIG. 1C. The device 400 includes a ring light 4001, a ring plane of polarization control element 4002, a shooting lens 4003 and an image sensor 4004.

Figure 30B:
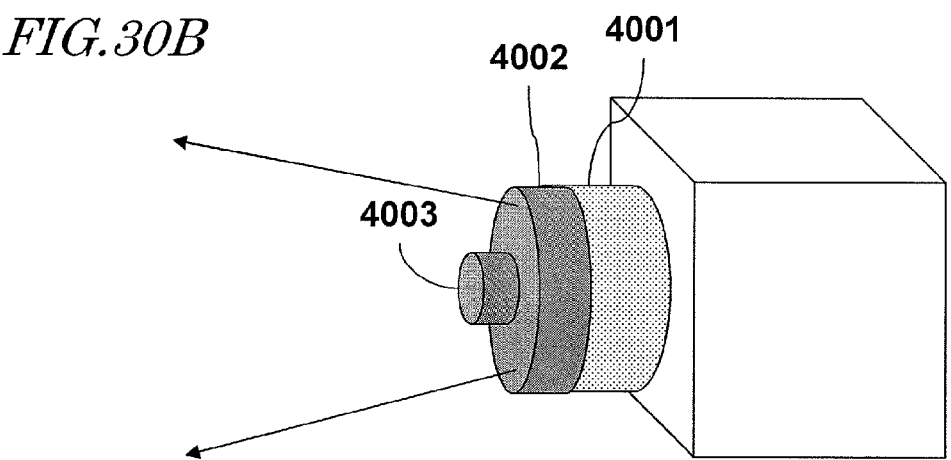
FIG. 30B illustrates the appearance of the third embodiment of the present disclosure.

FIG. 30B illustrates a general appearance of the device shown in FIG. 30A. In this embodiment, the ring plane of polarization control element 4002 is arranged on the ring light 4001. A non-polarized light ray is input through a light guide 401 such as an optical filter to the ring light 401 and the plane of polarization control element 4002 and has its plane of polarization rotated in the order of 0, 45, 90 and 135 degrees as shown in FIG. 2.

Alternatively, the ring light 4001 may also be a self-emitting light source such as an LED without using such a light guide that propagates the light emitted from a light source. Also, if the angle defined by the optical axis of the image sensor with respect to that of the illuminating light is 15 degrees or less, the ring light may also be replaced with a strobe light. However, if the ring light is used, even an object that would be hard to observe with only one light can also have its surface microfacets and grooves estimated with high precision. Among other things, in that case, since the optical axis of the illuminating light can be substantially aligned with that of the image sensor and can also be uniform, this device can be used effectively as a device for scanning the surface of a product for any scratches or checking its microfacets, a fingerprint scanner, or a skin unevenness checker for a dermatologist. As for the image sensor 4004 and the image processing processor (not shown), the image processing processor of the first embodiment can be used.

In the embodiment described above, the plane polarized light as the light source is supposed to be rotated on a 45-degree-a-time basis. However, the angle of rotation does not have to be the same, but may be changed, each time. On top of that, the angular interval does not have to be 45 degrees, either. Nevertheless, in order to determine three parameters for a cosine function, at least three samples are needed. That is to say, as for plane polarized light as a light source, its angle of rotation can be changed into three or more different values. For example, if three sample angles are used, the three angles of 0, 60 and 120 degrees may be selected, for example.

The present invention is broadly applicable to the field of image processing that needs observing, checking, or recognizing the object's surface microfacets using a medical endoscope camera, a medical camera for dermatologists, dentists, internists or surgeons, an industrial endoscope camera, a fingerprint scanner, or an optical surface analyzer.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An image processing apparatus comprising:
a polarized light source section that sequentially illuminates an object with three or more kinds of plane polarized light rays, of which the planes of polarization have mutually different angles;
an image capturing section that sequentially captures an image of the object that is being illuminated with each of the three or more kinds of plane polarized light rays and directly receives light that is returning from the object by way of no polarizers, thereby getting an intensity value;
a varying intensity processing section that obtains a relation between the angle of the plane of polarization and the intensity value of each pixel based on a signal representing the intensity value supplied from the image capturing section, thereby generating an intensity maximizing angle image that is defined by the angle of the plane of polarization that maximizes the intensity value with respect to each said pixel and a degree of intensity modulation image that is defined by the ratio of the amplitude of variation in the intensity value caused by the change of the plane of polarization to an average intensity value with respect to each said pixel; and
a normal estimating section that estimates, based on the intensity maximizing angle image and the degree of intensity modulation image, a normal to a tilted surface in a V-groove on the object's surface on a pixel-by-pixel basis.

2. The image processing apparatus of claim 1, wherein the normal estimating section includes:
an azimuth angle processing section that obtains candidates for the azimuth angle of the normal based on the intensity maximizing angle image;
a zenith angle processing section that obtains the zenith angle of the normal based on the degree of intensity modulation image; and
an azimuth angle ambiguity processing section that chooses one among those candidates for the azimuth angle of the normal.

3. The image processing apparatus of claim 1, comprising a normal image generating section that generates an image of the normal that has been estimated by the normal estimating section.

4. The image processing apparatus of claim 1, wherein the azimuth angle ambiguity processing section chooses one among those candidates for the azimuth angle of the normal by reference to either a non-polarized light intensity image corresponding to an image under non-polarized light or the degree of intensity modulation image.

5. The image processing apparatus of claim 4, wherein the varying intensity processing section adds together the multiple light intensity images that have been obtained by the image capturing section and calculates their average, thereby generating and giving the non-polarized light intensity image to the azimuth angle ambiguity processing section.

6. The image processing apparatus of claim 4, wherein the azimuth angle ambiguity processing section chooses one among those candidates for the azimuth angle of the normal based on at least one of the respective spatial gradient vectors of the non-polarized light intensity image and the degree of intensity modulation image.

7. The image processing apparatus of claim 1, wherein the polarized light source section and the image capturing section are attached to an endoscope.

8. The image processing apparatus of claim 1, wherein the polarized light source section gets non-polarized light transmitted through a plane of polarization changer that is able to change planes of polarization, thereby radiating plane polarized light rays, of which the plane of polarization sequentially changes into one of three or more different types after another.

9. The image processing apparatus of claim 1, wherein an angle of 15 degrees or less is defined between the respective optical axes of the polarized light source and the image capturing section.

10. The image processing apparatus of claim 1, wherein the image capturing section includes either a monochrome image sensor or a color image sensor.

11. The image processing apparatus of claim 1, comprising:
an illuminating direction setting section that virtually changes freely the illuminating direction of the object; and
a light intensity image generating section that generates, based on the output of the normal estimating section, a light intensity image of the object being illuminated in the illuminating direction.

12. The image processing apparatus of claim 1, wherein the polarized light source section includes, on its output stage, a spectral filter that transmits light falling within a wavelength range associated with a reflectance at which the spectral reflectance characteristic at the object's surface reaches a local minimum.

13. The image processing apparatus of claim 1, wherein the polarized light source section includes:
a ring light source that radiates non-polarized light; and
a ring plane of polarization changer that transforms the non-polarized light radiated from the ring light source into the plane polarized light ray and that is able to change the angle of the plane of polarization of the plane polarized light ray sequentially.

14. An image processing method comprising the steps of:
sequentially illuminating an object with three or more kinds of plane polarized light rays, of which the planes of polarization have mutually different angles;
sequentially capturing an image of the object when the object is being illuminated with each of the three or more kinds of plane polarized light rays and directly receiving light that is returning from the object by way of no polarizers, thereby getting an intensity value;
obtaining a relation between the angle of the plane of polarization and the intensity value of each pixel, thereby generating an intensity maximizing angle image that is defined by the angle of the plane of polarization that maximizes the intensity value with respect to each said pixel and a degree of intensity modulation image that is defined by the ratio of the amplitude of variation in the intensity value caused by the change of the plane of polarization to an average intensity value with respect to each said pixel; and
estimating, based on the intensity maximizing angle image and the degree of intensity modulation image, a normal to a tilted surface in a V-groove on the object's surface on a pixel-by-pixel basis.

* * * * *